INVENTORS
CHESTER H. DAWSON
ROBERT T. CATLIN
ROBERT O. SWAIN
BY ROBERT J. TURTON
Ward, Haselton, McElhannon,
Brooks & Fitzpatrick
ATTORNEYS

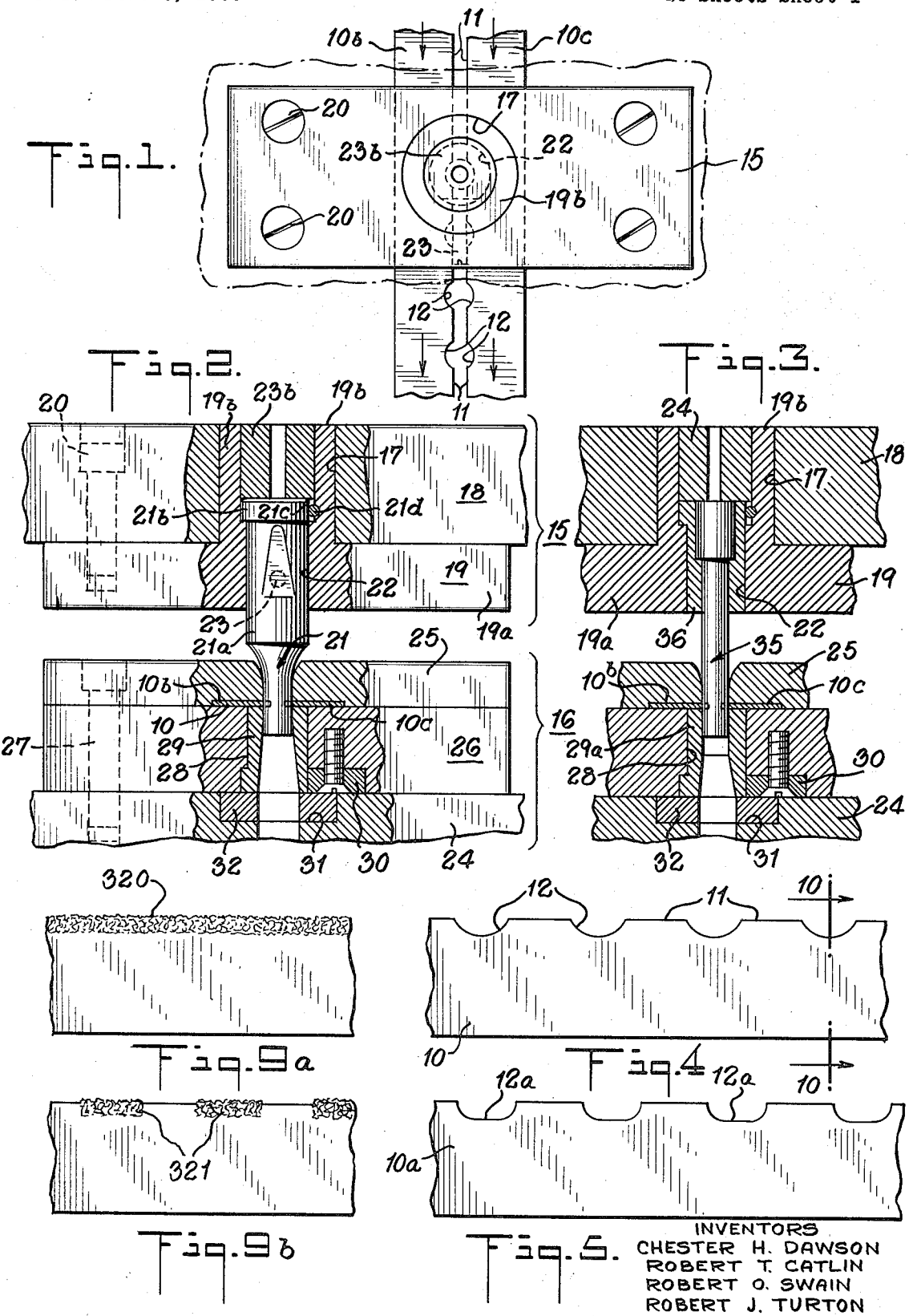

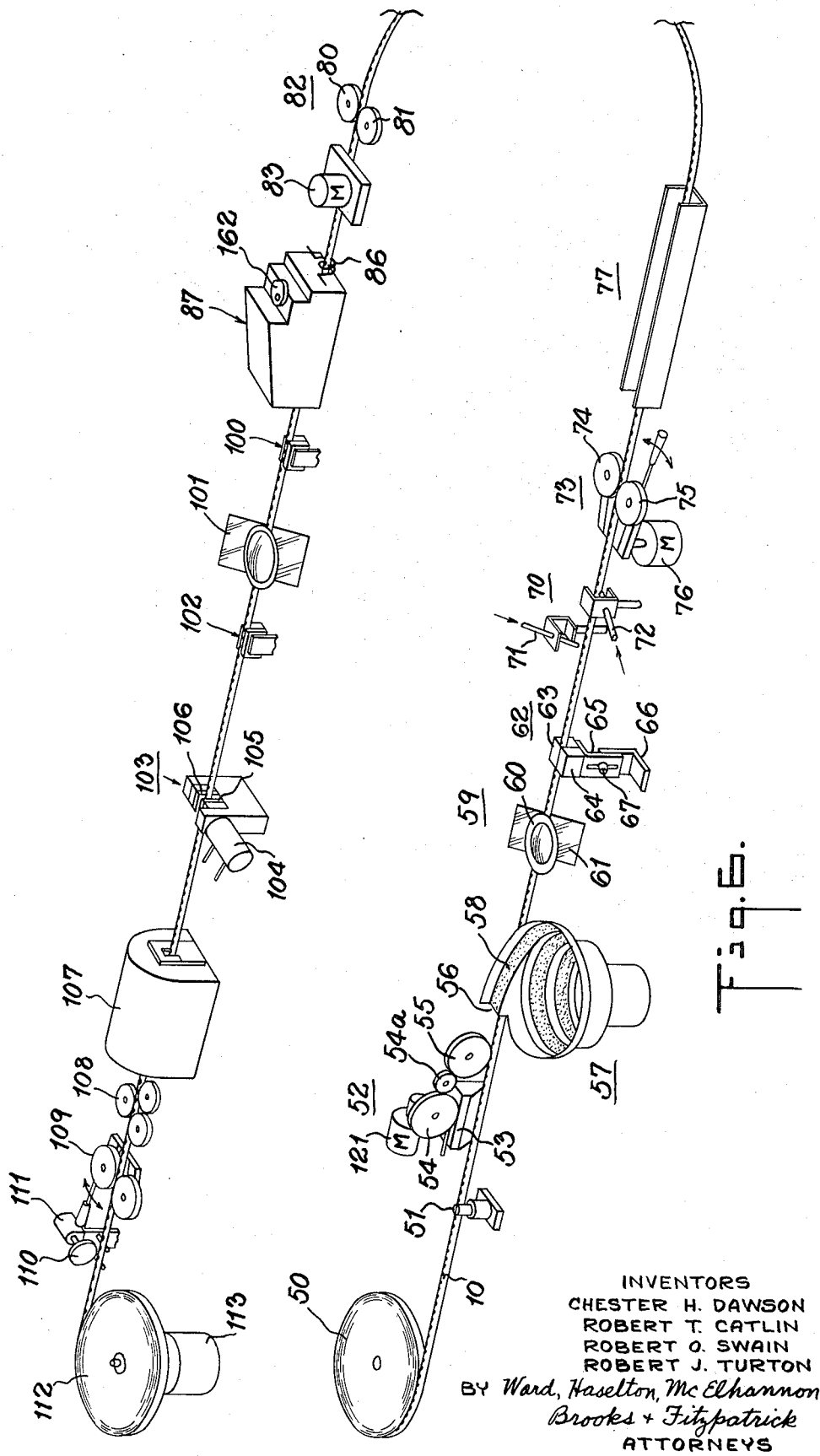

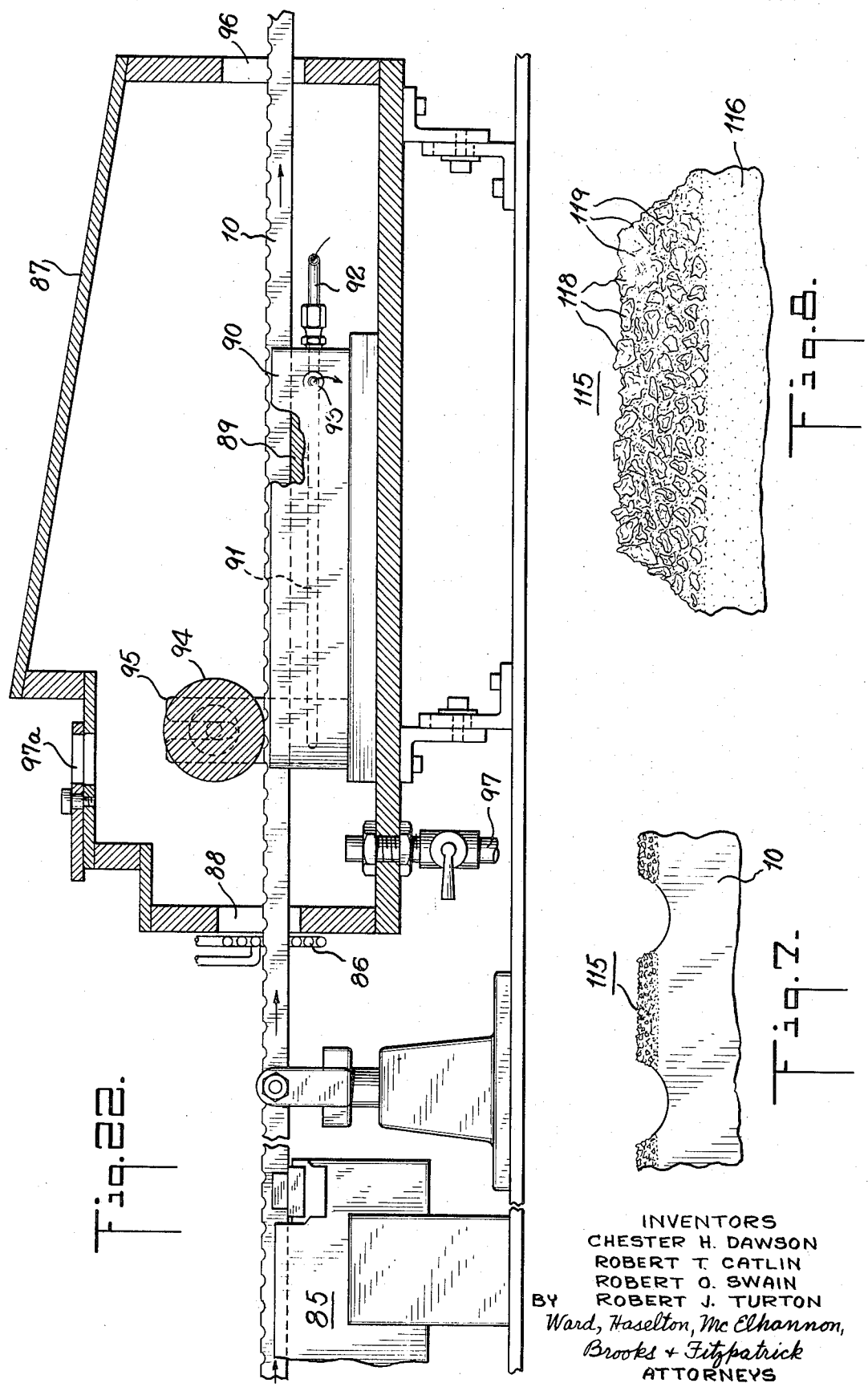

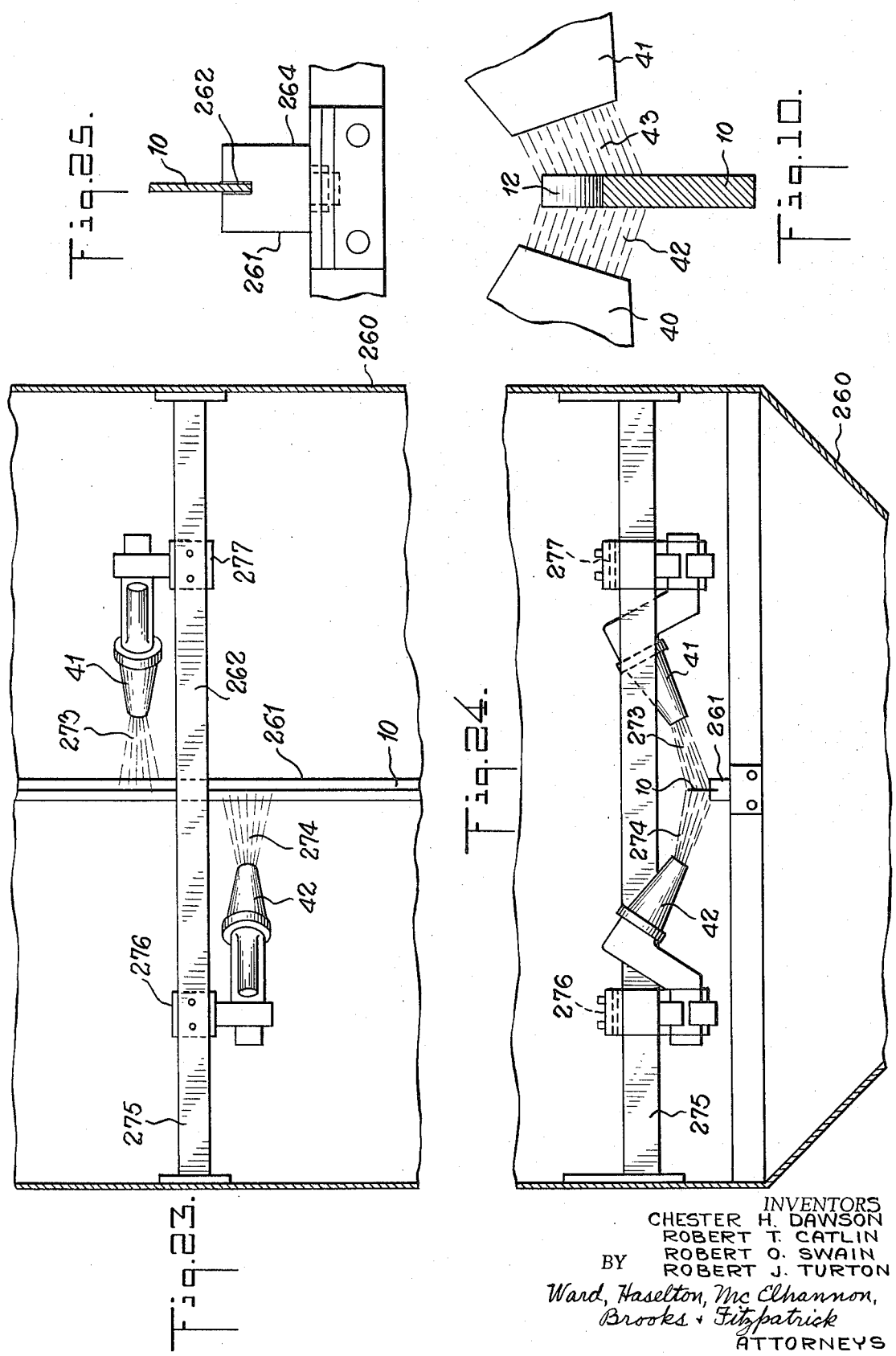

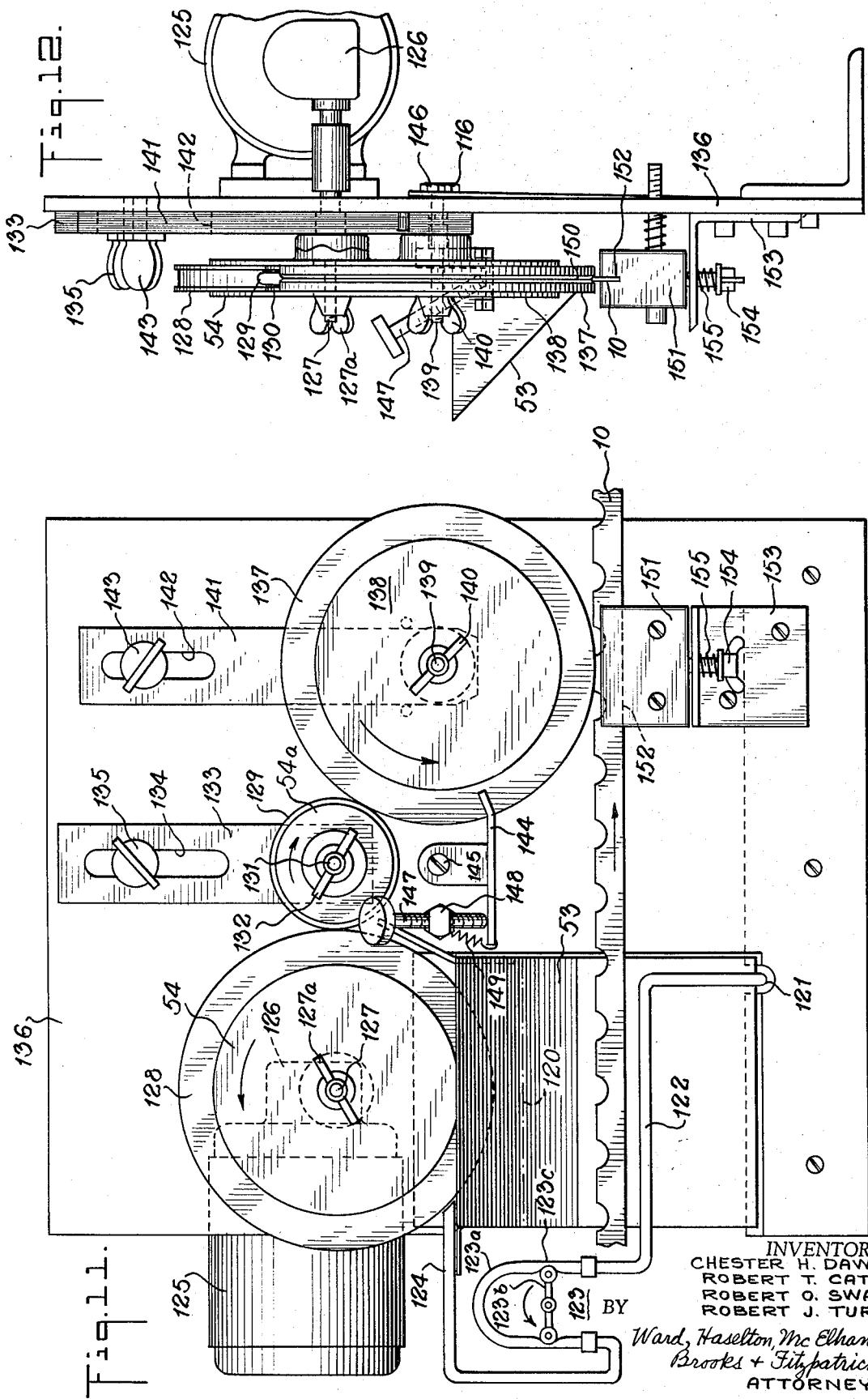

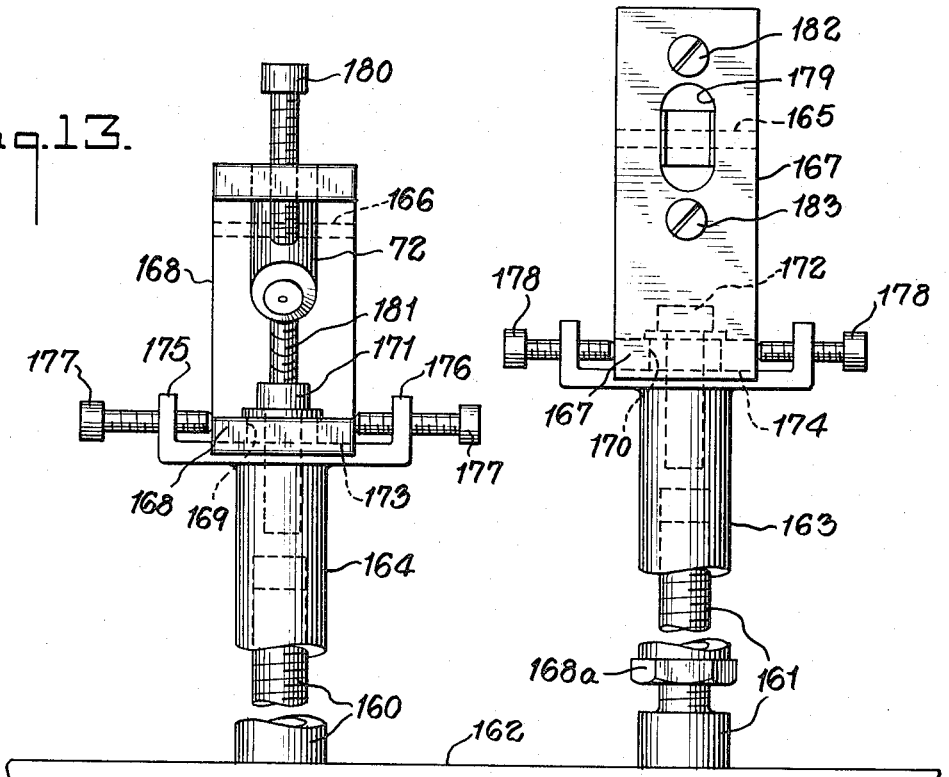
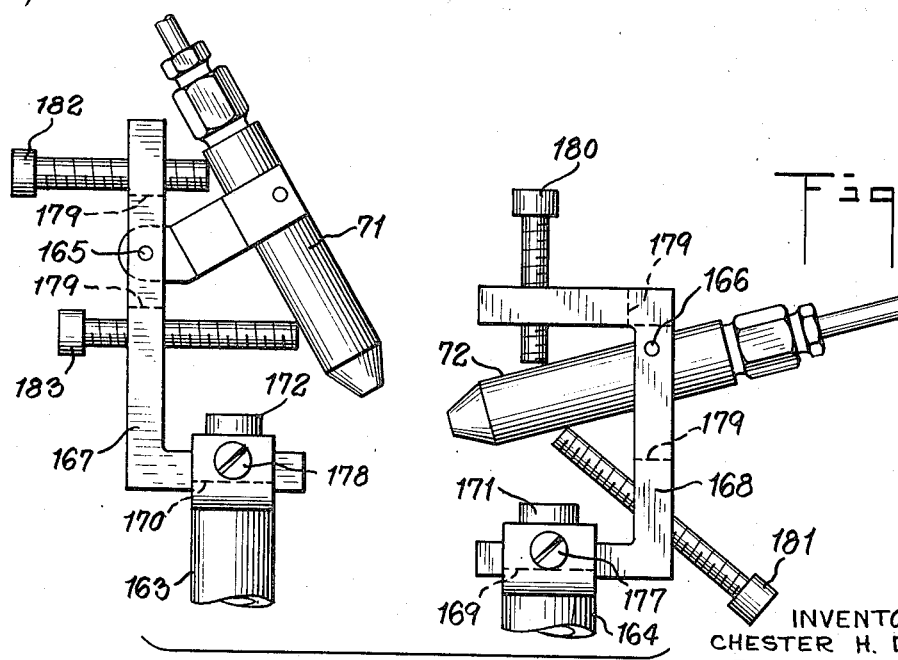

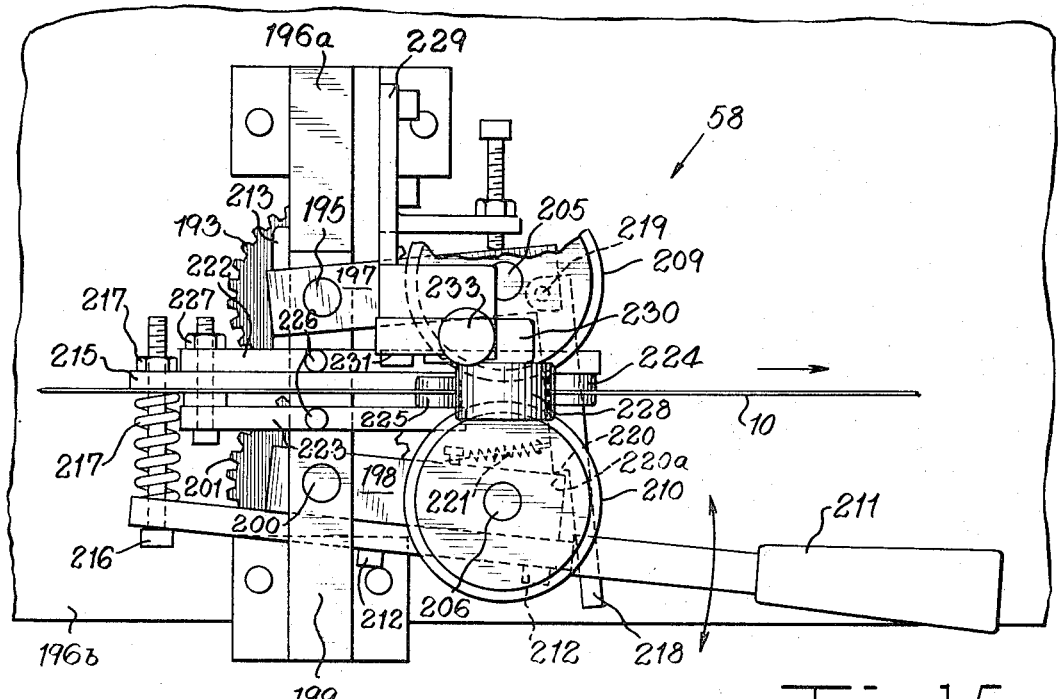
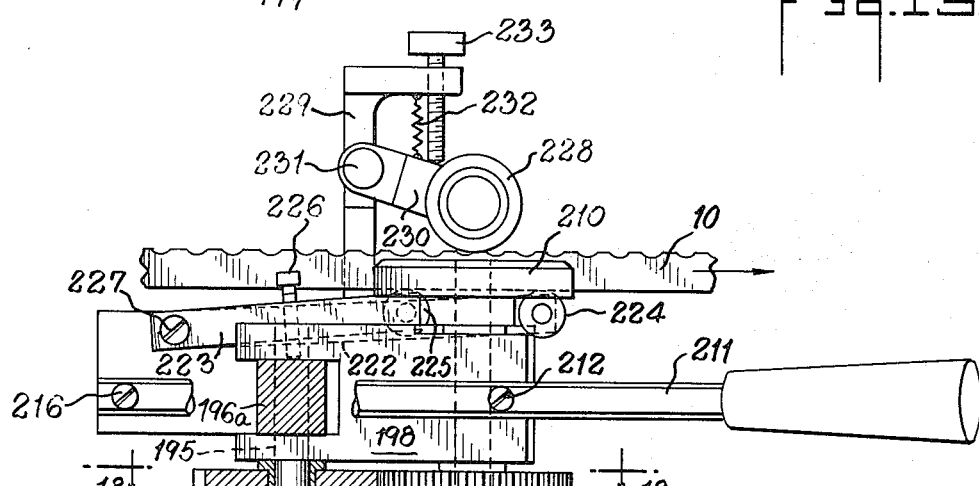
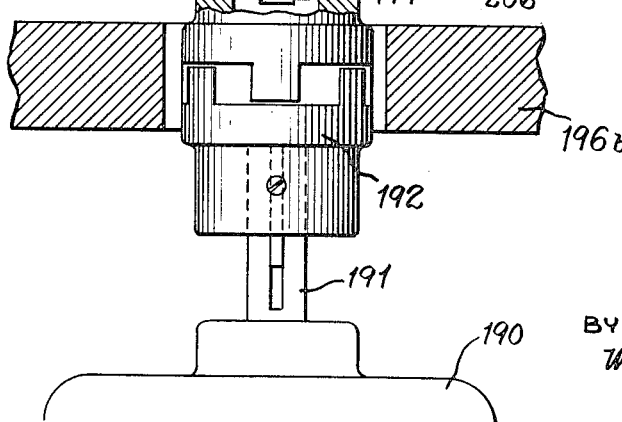

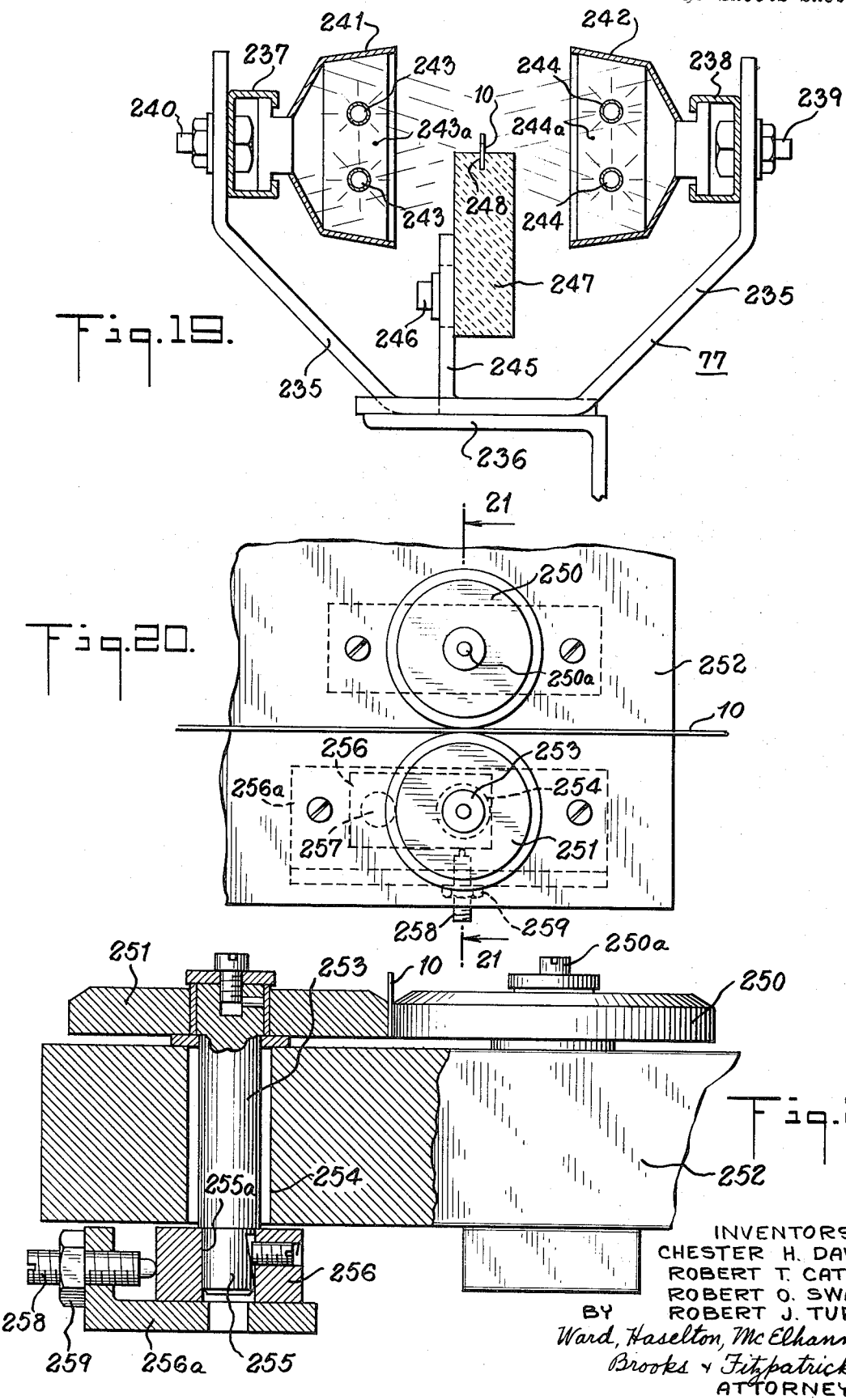

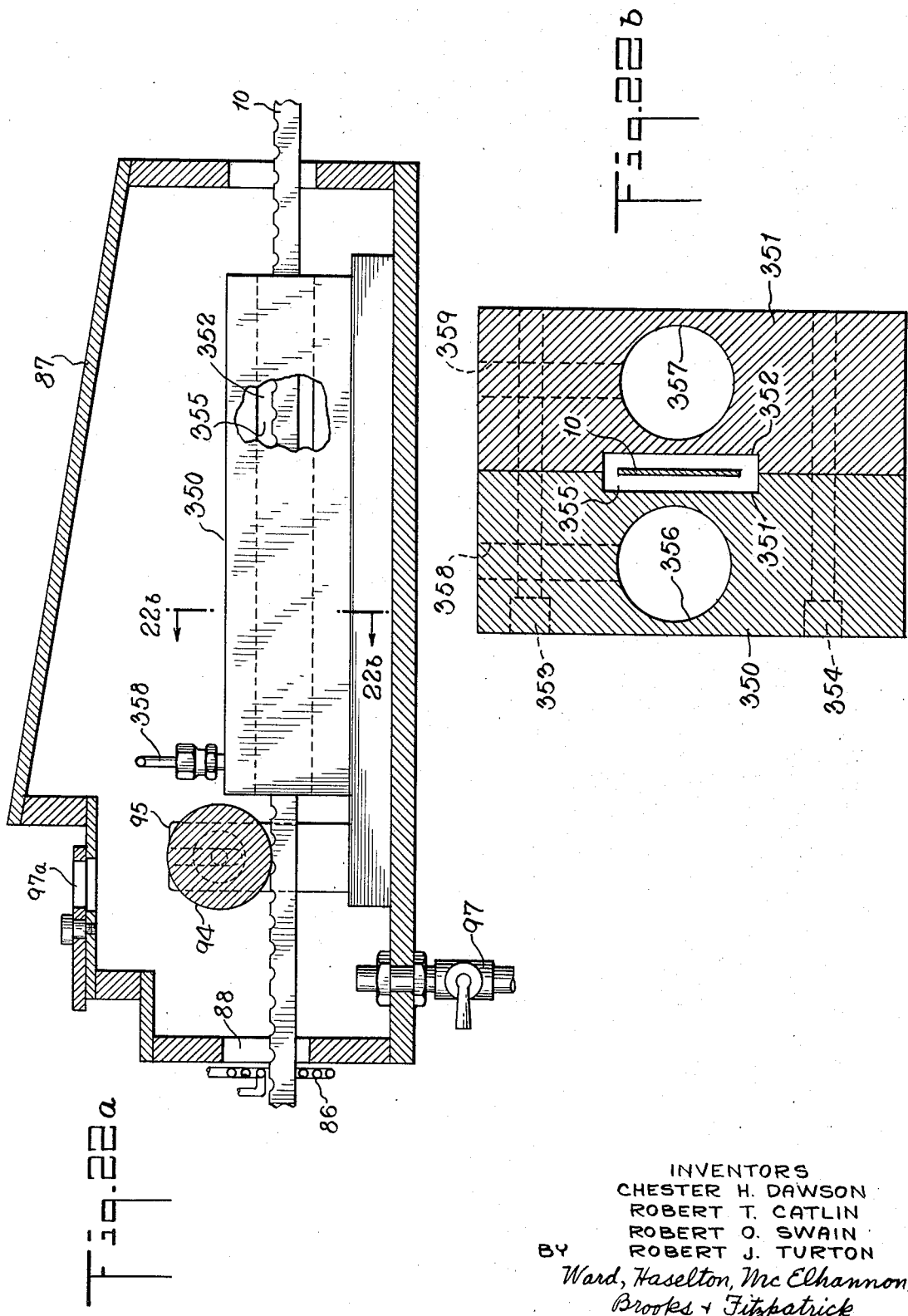

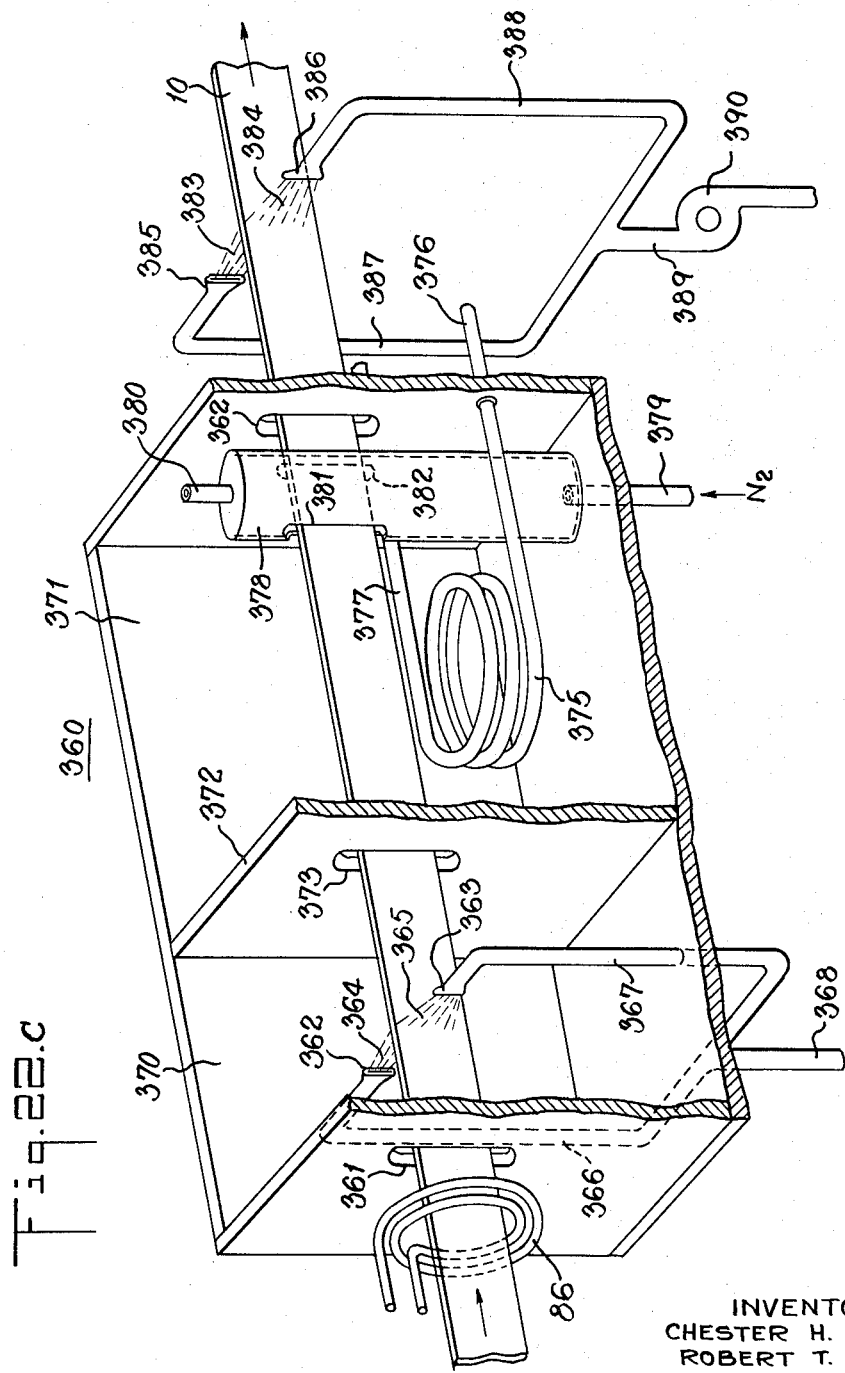

INVENTORS
CHESTER H. DAWSON
ROBERT T. CATLIN
ROBERT O. SWAIN
ROBERT J. TURTON
Ward, Haselton, McElhannon,
Brooks + Fitzpatrick
ATTORNEYS

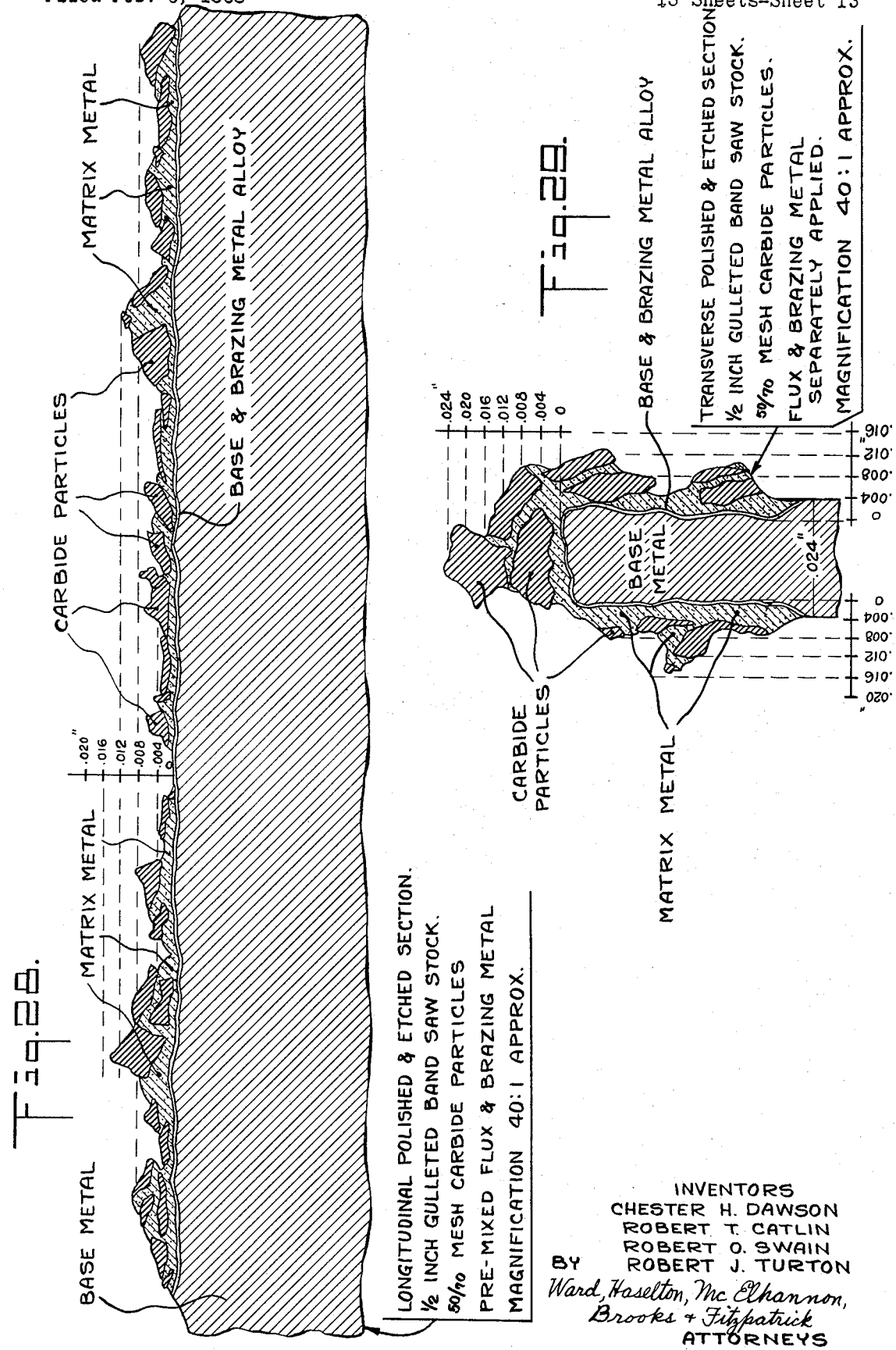

3,598,554
METHODS FOR PRODUCING ARMORED METAL TOOLS
Chester H. Dawson, Danbury, Robert T. Catlin and Robert O. Swain, Trumbull, and Robert J. Turton, Fairfield, Conn., assignors to Remington Arms Company, Inc., Bridgeport, Conn.
Filed Feb. 8, 1968, Ser. No. 703,931
Int. Cl. B24d *15/02*
U.S. Cl. 51—293                               33 Claims

ABSTRACT OF THE DISCLOSURE

Methods for producing armored metal tools consisting of a tool structure composed of a base metal having over at least a surface portion thereof, a hard wearing, ductile, and adherent, abrasive coating, and according to which said surface portion of said base metal is coated with a paste flux adhesive and with particles of a powdered matrix metal, applied separately and sequentially or in admixture, and to which coating is applied an overcoating of abrasive particles of a hard, high melting, diamond substitute material, such as tungsten carbide particles and the like, the so coated portion of the tool, or alternatively the entire tool, being then heated to temperature sufficiently high to fusion bond said matrix metal particles to one another and to said base metal and into a matrix metal layer embedding said abrasive particles therein, the heated tool portion or tool being then rapidly cooled to ambient temperature permanently to bond said matrix metal layer to said base metal and permanently to embed said abrasive particles in said matrix metal layer, the thickness of said matrix metal layer being so controlled in relation to the particle size of said abrasive particles, as only partially to embed said abrasive particles therein, whereby said abrasive particles project from said layer to form a myriad of sharp cutting edges. The base metal may comprise a heat treatable, ferritic steel or alloy steel, which is hardened by the heating and cooling cycle aforesaid and which may be thereafter tempered to a desired degree of hardness and ductility.

---

This invention pertains to methods and apparatus for producing improved armored metal tools, said tools having a hard wearing, ductile, abrasive coating produced in situ from powdered metal particles of a hard, refractory brazing or matrix metal alloy, such as nickel-base or cobalt-base alloys, and abrasive particles of hard, high melting material, such as metal carbides or equivalent diamond substitute materials, said tool comprising a structural base composed of a base metal, such as steel, alloy steel, etc., at least a portion of the surface of which is covered with a relatively thin, adherent and homogeneous layer of substantially uniform thickness, of said metal powders fusion bonded to each other and to said base metal and alloyed or interdiffused with said base metal throughout an interlayer between said base metal and coating layer, said coating layer of said fusion bonded metal powders having embedded therein and projecting from the surfaces thereof, a multiplicity of said abrasive particles to provide sharp cutting edges for cutting or abrading applications.

These improved tools may take the form of saws, files, rasps, sanding disks, abrasive sheets, and the like. All are characterized by a myriad of relatively small individual cutting teeth provided with exposed sharp edges of particles of diamond substitute materials, such as hard, refractory carbides, borides, nitrides and silicides. In each case, the cutting particles are supported from a metallic base, usually a heat treatable ferrous base metal or alloy, by a matrix of a hard, refractory alloy, such as cobalt-base or nickel-base alloys, containing substantial amounts of one or more of chromium, tungsten, boron and silicon, which alloys are capable of wetting the surface of and bonding to the cutting particles, and also capable of alloying by fusion with or diffusion into the surface layers of the underlying base metal and vice versa. The refractory alloy is also one which melts only at temperatures well above the upper transformation point of the base metal, such that the base can be heat treated by conventional techniques as by heating, quenching and tempering to develop desired combinations of strength, hardness and ductility, without affecting the ability of the matrix tenaciously to retain the cutting particles.

To assure that the diamond substitute particles project sufficiently beyond the layer of matrix metal to provide a myriad of said sharp cutting edges, the thickness of the matrix metal layer preferably does not exceed about one-half to two-thirds the average transverse dimensions of said abrasive particles, whereby said abrasive particles project beyond said layer to an average extent of at least about one-third to one-half their average transverse dimensions, as shown by the measurements and etched sections hereinafter presented and discussed.

The invention is more particularly directed to improved saws and more especially band saws and band saw strip stock, and to novel methods and apparatus for producing them, said saws and saw stock being characterized by the application of armoring coatings of the character aforesaid to at least one edge to form a cutting edge. For cutting heavy stock, the strip is preferably blanked out or gulleted at equi-spaced intervals to provide cutting teeth between the gullets, the teeth being armored in accordance with the invention. For cutting thin stock, the gullets may be omitted and the armoring applied continuously or intermittently along the cutting edge, as hereinafter described in detail.

For producing armored metal tools in accordance with the basic methods of the invention, the tool comprised of the base metal may first be coated over a selected surface area with an admixture of a suitable paste flux adhesive in admixture with the brazing metal powders in appropriate proportions, or alternatively a coating of the paste flux adhesive alone may first be applied and an overcoating of the brazing metal powders next applied. To the resultant coating applied by either procedure, there is applied a further overcoating of the abrasive metal particles, following which the coated surface is dried and the tool subjected preferably to high frequency electrical induction heating to temperature such as to fusion bond the matrix metal powders to one another and to the base metal, as to the latter by alloying therewith, and also partially to embed the abrasive metal particles therein. Immediately thereupon the tool is subjected to a cooling treatment to solidify the matrix metal layer thus permanently to embed the abrasive metal particles therein and to produce a solid state alloying layer between the matrix and base metals, thus permanently bonding the two together. Without interfering with the bonding of the matrix metal the cooling may be rapid enough to constitute quenching as part of the heat treatment of the base metal. The paste flux adhesive employed must be such as to leave no residuum of unabsorbed material in the armor coating as this weakens the structure. The preferred paste flux adhesive is such as volatilizes in part on heating the tool to the brazing temperature leaving a residuum which interdiffuses or alloys with the brazing and base metals. As pointed out more particularly below, paste flux adhesives of this character include those of boride-fluoride or organic base. Silicate containing fluxes are undesirable because they leave a residuum of silica or silicates in the matrix metal layer, which weakens the armoring.

The base metal of the tool is preferably such as to be heat treatable to high hardness after heating to the brazing temperature of the matrix metal and quenching therefrom, following which the tool may be tempered to a desired combination of lower hardness and ductility. Such metals include principally the ferritic steels and steel alloys.

It is a vitally important aspect of the novel process and product of the invention that the coating technique be so controlled that the abrasive particles are only partially embedded in the matrix metal layer and thus protrude beyond the same to form a myriad of sharp cutting edges. This may be accomplished by applying a relatively thin coating of the matrix metal powders, by employing a particle size for the matrix metal powders which is considerably less than that of the abrasive particles, or by superimposing the coating layer of abrasive particles on top of the coating layer of matrix metal powders.

The exact nature of the invention, as well as other objects and advantages thereof, will become more apparent from consideration of the following specification, referring to the attached drawings, illustrating preferred and modified embodiments of the invention, as applied more particularly to the production of band saw strip stock, and in which:

FIG. 1 is a top view of a gullet die set for punching gullets at equi-spaced intervals along an edge of band saw strip stock; while FIG. 2 is a side elevational view, partly broken away, of the die set shown in FIG. 1.

FIG. 3 is a partial vertical sectional view of a modified form of die set.

FIG. 4 is an enlarged plan view of a portion of the band saw strip with arcuate gullets punched therein, while FIG. 5 is a similar view with somewhat elongated gullets as punched therein with the FIGS. 1–3 die sets but using circular or substantially oval shaped die punches, respectively.

FIG. 6 is a more or less diagrammatic showing in perspective illustrative of an apparatus assembly and method according to an embodiment of the invention for applying an armoring coating to an edge of the band saw strip stock, wherein the paste flux adhesive and brazing metal powders are pre-mixed prior to application to the base metal strip stock.

FIG. 7 is a plan view of a portion of the gulleted band saw strip stock after armoring with the method and apparatus of FIG. 6, while FIG. 8 is a greatly enlarged plan view of one of the armored teeth of the FIG. 7 showing. FIGS. 9a and 9b are plan views corresponding to FIG. 7, but wherein no gullets are cut into the band saw strip stock prior to armoring. In the FIG. 9a embodiment, the armoring is applied continuously along one edge of the strip stock, while in FIG. 9b, it is applied intermittently at spaced intervals therealong.

FIG. 10 is a fragmentary showing, partly in section, of a pair of nozzles of a grit blasting apparatus as shown more fully in FIGS. 23–25, inclusive, referred to below, and band saw strip stock assembly, for removing burrs from gulleted portions of the band saw strip stock after punching.

FIG. 11 is a view in front elevation and FIG. 12 a view in side or end elevation, of an apparatus for applying a coating of paste flux or an admixture of paste flux and brazing metal powders to an edge of the band saw strip stock.

FIG. 13 is a front elevational view of a pair of hair spray units used to remove loosely adhering carbide particles from the gullet portions of the armored strip. FIG. 14 is a side or end elevational view of FIG. 13.

Figure 17:
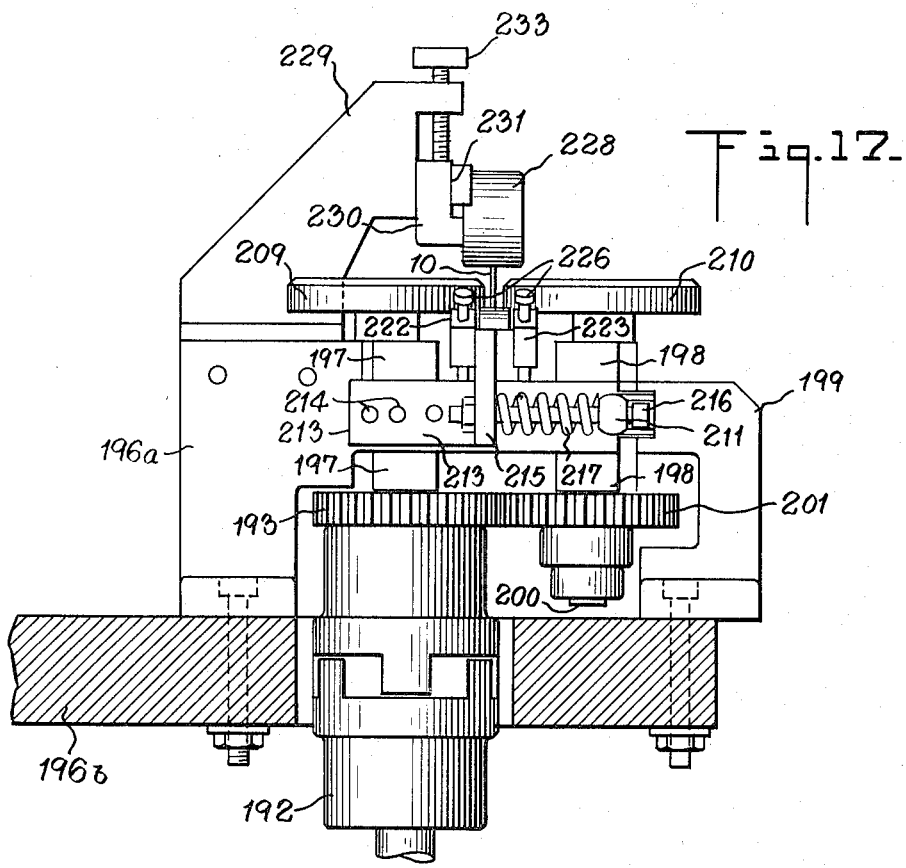
Figure 18:
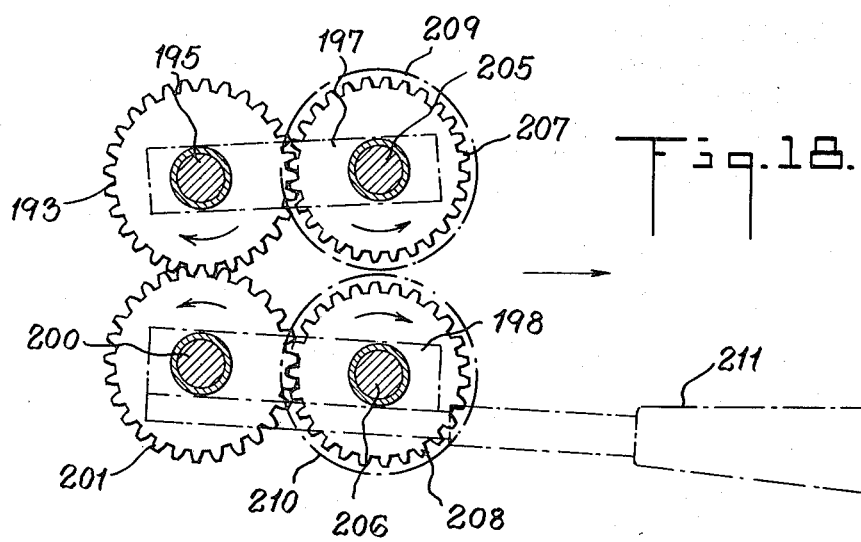

FIGS. 15–18 are views of one of the drive assemblies incorporated in the apparatus sequence of FIG. 6 to feed the band saw strip stock continuously from one station to another. FIGS. 15 and 16 are respectively plan and side elevational views partly broken away, while FIG. 17 is an end view of the drive, and FIG. 18 is a horizontal sectional view taken on line 18—18 of FIG. 16.

FIG. 19 is a vertical transverse sectional view through an infra-red ray heating unit employed in the FIG. 6 sequence.

FIG. 20 is a plan view of a strip tensioning roller unit of the FIG. 6 sequence, and FIG. 21 is a vertical sectional view taken on line 21—21 of FIG. 20.

FIG. 22 is a vertical longitudinal sectional view through an induction heating coil and subsequent controlled atmosphere, rapid cooling unit apparatus employed in the FIG. 6 sequence for purposes and in the manner described below.

FIG. 22a is a vertical longitudinal sectional view through a modified form of induction heating coil and subsequent controlled atmosphere, rapid cooling unit apparatus which may be employed in the FIG. 6 sequence in replacement of the FIG. 22 apparatus, while FIG. 22b is a partial transverse sectional view of the FIG. 22a showing as taken at 22b—22b thereof.

The FIG. 22c is a perspective view with parts broken away to show the interior construction, of a still further form of induction heating coil and subsequent controlled atmosphere, rapid cooling apparatus which may also be employed in the FIG. 6, sequence in replacement of the FIG. 22 apparatus.

FIGS. 23–25, inclusive, are views of the above-mentioned grit blasting apparatus for grit blasting an armored band saw to remove flux and scale which may be adhering thereto; FIGS. 23 and 24 being framentary plan and elevational views, partly in section of the essential assembly thereof, while FIG. 25 is an enlarged view in end elevation of a portion of said assembly.

Figure 26:
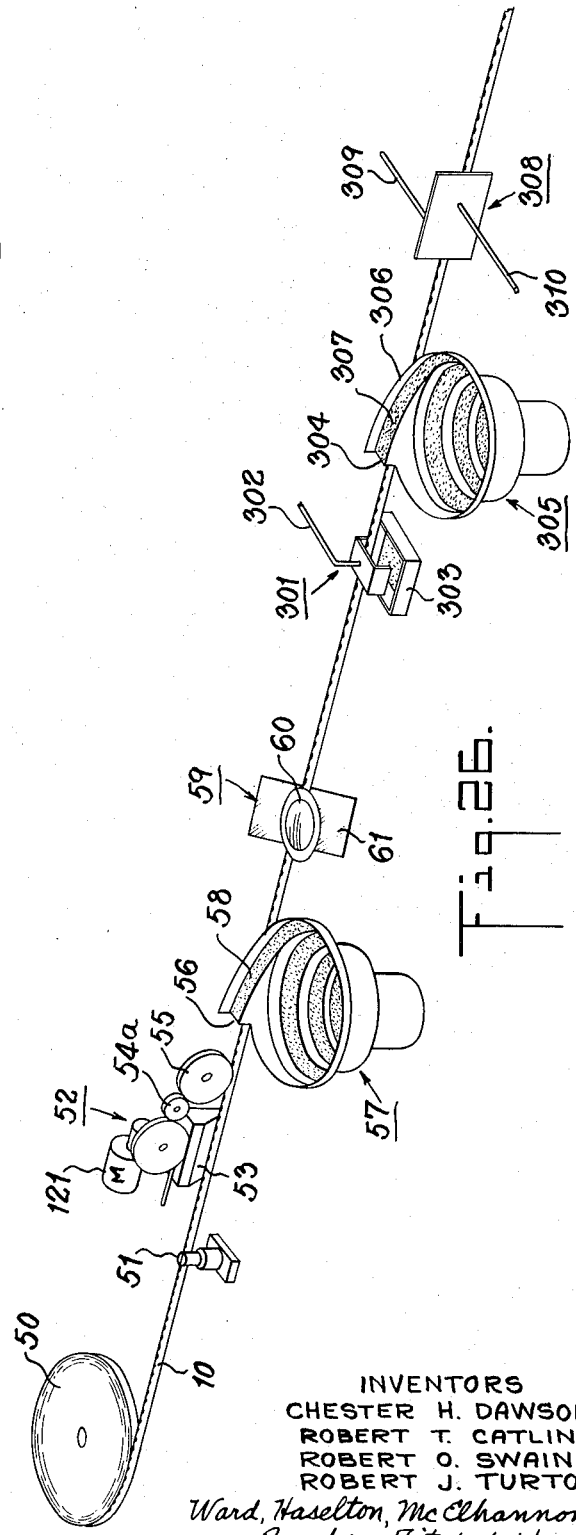

FIG. 26 is a more or less diagrammatic fragmentary showing in perspective illustrative of a method and apparatus according to an embodiment of the invention for applying an armoring coating to an edge of the band saw strip stock, wherein the paste flux adhesive and brazing metal powders are separately applied to the strip stock.

Figure 27:
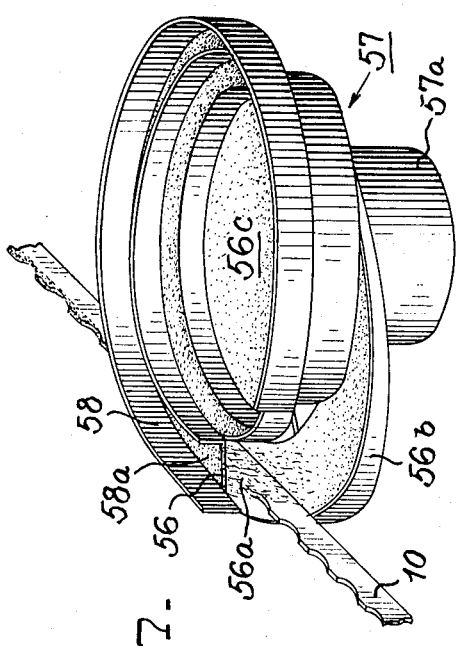

FIG. 27 is a perspective view of a vibratory feeder operating on the principle of a "Syntron" vibrator, but of novel, spiral construction and which is employed in the apparatus sequences of FIGS. 6 and 26.

FIG. 28 is a view of a polished and etched section of gulleted, armored band saw strip stock, as taken longitudinally thereof, and as produced by the method of the FIG. 6 sequence wherein the paste flux and brazing metal powders are pre-mixed prior to applications to the strip stock base metal.

FIG. 29 is a view of a polished and etched section of gulleted, armored band saw strip stock, as taken transversely through one of the armored teeth thereof, and as produced by the method of the FIG. 26 sequence, wherein the paste flux and brazing metal powders are separately applied to the strip stock base metal.

Referring to FIGS. 1, 2 and 4, the band saw strip stock 10, comprising, for example, a suitable grade of heat treatable alloy steel, such for example as SAE 6150 of approximate analysis 0.5% C, 0.8% Mn, 0.25% Si, 1% Cr, 0.15% V, balance Fe, specified below, is first punched along one edge, as at 11, to punch out arcuately shaped gullets at equally spaced intervals, as at 12. The punching apparatus of FIGS. 1 and 2, comprises a punch block assembly 15 and a die block assembly 16. Seated in an appropriately drilled hole 17 in a punch block 18 is a punch holder 19, comprising a rectangular lower portion 19a and an upstanding cylindrical portion 19b. Punch holder 19 is removably attached to punch block 18 by bolts as at 20. The gullet punch 21 has integral therewith an enlarged cylindrical heat portion 21a and flanged upper end 21b, which is set into a drilled bore 22 of the punch holder 19, and is secured thereto by set screw 23; while the upper flanged end 21b of the gullet punch, is restrained by a back-up button 23b. In order to prevent rotation of the punch, the upper flanged end 21b, is provided with a flat surface portion 21c, against which bears a locating pin 21d.

The die block assembly 16 includes a back-up plate 24, a stripper plate 25, and an interposed plate 26, removably attached by bolts as at 27. An appropriately drilled hole 28, receives gullet die 29 which is secured therein by locking and locating means 30. The back-up plate 24 is recessed as at 31 to receive a rest button 32.

In the operation of the apparatus for blanking the band saw stock 10 with the gullets 12, conventional means (not shown) are utilized for concurrently feeding two spaced and parallel strips 10b and 10c of the band saw stock, intermittently in the direction of the arrows. Also, the punch block is vertically reciprocated by conventional means (not shown) in synchronism with the stock feed means. As the punch block assembly 15 is raised, the strip stocks 10b, 10c are advanced an amount equal to the distance between the midpoints of adjacent gullets, and upon descent of the punch block assembly, a new gullet is punched at the proper spacing from that last punched in each of the strips 10b, 10c.

In the FIGS. 1 and 2 embodiment, the gullet punch 21 and die 29 are made of tool steel. In the FIG. 3 embodiment both the punch 35 and die 29a are made of a cemented carbide composition, such as tungsten carbide particles embedded in a matrix metal of iron, nickel, cobalt, etc., generally referred to as tungsten carbide punches and dies. Such tools have much longer wear life than tools made of conventional tool steel. In FIG. 3 the tungsten carbide punch 35 is held in a sleeve member 36, the construction in other respects except for the die 29a, being similar to that of the FIGS. 1 and 2 embodiment, like elements being similarly designated.

After the strip stock has been gulleted as in FIG. 4 or 5, it is wire brushed on both sides and thence grit blasted in the manner illustrated in FIG. 10 to remove any burrs produced along the gullet edges as a result of the punching operation. Referring to FIG. 10, the strip 10 is fed longitudinally past and between a pair of grit blasting nozzles 40, 41 from which grit blast 42, 43, are directed against the opposite surfaces of the strip and along the upper edge as shown, thus to blast off all residual burrs occurring in the gulleted portions, as at 12, and to impart matte surfaces to the strip, which facilitates application of the armoring coating as hereinafter described.

The band saw strip stock 10 as thus prepared is now ready for application to the gulleted edge, of a protective armoring coating as above generally described, and which preferably is accomplished by means of the method and apparatus shown in FIG. 6. To this end the blanked strip 10 is fed progressively from a reel 50 thereof, and in vertically disposed position with reference to its height with the blanked edge at the top, first through a guide 51 and then beneath a feed roll 55 of an applicator unit 52 as hereinafer described with reference to FIGS. 11 and 12 for applying to the upper edge of the strip a coating comprising an admixture of paste flux and brazing metal powders contained in a reservoir 53 and transferred thence to roll 55 via pick up and transfer rolls, 54 and 54a, respectively.

A suitable paste flux for this purpose is that put out by Wall Colmonoy Corporation, Detroit, Mich. under the designation "Nicrobraz Flux," as suitably thinned with water, and which is a boride-fluoride flux. Alternatively an organic adhesive may be employed as described in U.S. Pats. 3,024,128 and 3,023,490, C. H. Dawson.

Suitable brazing metal powders for admixture with the paste flux are powdered, hard, refractory alloys, such as nickel-base or cobalt-base alloys, capable of providing a matrix metal which wets the surface of and bonds to the tungsten carbide or other diamond substitute particles and also which fusion bonds to or alloys with the metallic base. Suitable such alloys are the cobalt-base or nickel-base alloys, such as the cobalt-chromium-tungsten "Stellite" alloys or the nickel-base alloys put out by the aforesaid Wall Colmonoy Corporation under the designation "Nicrobraz." A preferred such alloy is that put out by said company as "LM Nicrobraz" comprising an alloy consisting of 13.5% Cr, 3.5% B, 4.5% Si, 2.5% Fe, 0.15% C and the balance Ni.

The strip as thus coated along its upper edge with the aforesaid admixture of flux paste and brazing metal powders, is now fed beneath the discharge lip 56, of a vibratory feeder 57 of spiral construction. This unit, referring to FIG. 29, is vibrated at high frequency by conventional means (not shown) enclosed in the base housing 57a. The spiral trough 58 of the vibrating unit, contains a mass of diamond substitute particles 58a, which by virtue of the vibration of the unit, are fed upwardly along the spiral trough 58 and discharge over the discharge lip 56 thereof in a thin layer which falls as a curtain of the powdered particles transversely across the upper edge of the strip 10, as at 56a. A thin layer of the carbide particles is thus deposited onto the coated upper edge of the strip, as limited, however, to the extent of the adherence of the carbide particles to said coated surfaces. The non-adhering excess of the particles fall into a return trough 56b which discharges these particles into a reservoir 56c thereof at the base of the spiral feed of the vibrator unit.

The strip is fed thence past an inspection station 59 consisting of an illuminated magnifying system 60 used in conjunction with a mirror 61 for inspection and quality control of the coated strip edge. The mirror is set at an angle of about 45 degrees to the vertical so that an observer may observe both the back as well as the front surfaces of the strip. Next, the coated strip is passed through a wiper assembly 62 comprising a pair of wipers 63, 64, mounted on an angle member 65 having a vertical slot therein as shown and carried by a second angle member 66 having threaded thereon a wing nut 67 for vertical adjustment of the wiper assembly.

The strip is fed next past an air blast unit 70, as shown more in detail in FIGS. 13 and 14 described below, and consisting essentially of a pair of nozzles 71, 72 adjustably positionable for blowing air at relatively low pressure against opposite sides of the strip below the coated edge thereof for removing loose tungsten carbide particles that may be deposited in the gullets or loosely adhering to the strip at this stage.

Next, the strip passes to a drive unit 73 and between a pair of pinch rolls 74, 75 thereat, driven by a motor 76 in the manner hereinafter described with reference to FIGS. 15-18, inclusive, wherein the strip is pulled from the takeoff reel 50 and through the apparatus previously described.

The strip passes thence through a trough like, infra-red ray heating unit 77, as described below with reference to FIG. 19, wherein the paste flux of the armoring coating is thoroughly dried.

Thence the strip passes between a pair of rolls 80, 81 of a tensioning unit 82 as hereinafter described with reference to FIG. 20, which tensions the strip at this point against the pull of the motor driven strip feed unit 109 at the end of the strip traverse as likewise hereinafter described. From the tensioning unit 82 the strip passes through an exhaust blower 83 for purposes described below.

The strip passes thence through an induction heating coil 86, supplied with high frequency electrical current, a suitable frequency being for example about 5.2 megacycles per second, for heating the strip to temperature of about 1900-2000° F., such as to cause the brazing metal powder to fuse and alloy with the base metal of the strip at the interface between them, also to embed the carbide particles therein and also to austenitize the alloy steel base metal of the strip. It has been found that the magnetic field of the induction heating coil has the effect of causing the carbide particles to project from the surface of the brazing metal and thereby enhance the cutting action of the so-armored tool.

Reverting now to the exhaust blower 83, its function is to draw air, smoke and flux vapor fumes from and through the induction heating coil 86, to prevent accumulation thereat of a conductive atmosphere such as might produce a flashover between the coil and the band saw strip stock.

The strip passes thence, referring to FIGS. 6 and 22, into a controlled atmosphere housing 87, through an entrance slot 88 therein and passes thence within the housing through a longitudinal slot 89 in a metal chill plate 90. The plate 90 is made of a metal of high thermal conductivity, such as copper or equivalent, and is chilled by circulation of a coolant, such as cold water, circulated therethrough by passages therein, as at 91, connected to inlet and outlet pipes, as at 92, 93, for supply and withdrawal of the coolant. As the strip passes along the slot in the chill plate, it is held down by passage under a hold down roll 94, adjustably mounted for vertical displacement in a suitable supporting structure 95. The strip passes out of the housing 87 through an outlet 96. The housing is filled with a substantially inert atmosphere, such as nitrogen gas injected therein via a valved pipeline 97 but is admixed with a small fraction of oxygen containing gas, such as that supplied from the outer atmosphere which leaks in through the inlet and outlet strip feed ports 88, 96. The housing roof is provided with an adjustable gas exit vent 97a.

As the strip is fed along the slot in the chill plate it is subjected to a rapid cooling action for two purposes. One is to solidify the fused matrix metal, thereby to form a permanent coating thereof alloyed with and bonded to the base metal and in which the carbide or other diamond substitute metal particles are permanently embedded. The other purpose is to transform the high temperature austenitic structure of the steel alloy base metal into a hard, fully martensitic structure which may thereafter be tempered to a desired lower degree of hardness with accompanying increased ductility and toughness. However, in order to accomplish this the steel strip must be cooled from the austenitic phase with sufficient rapidity to temperature below the lowermost nose of the time-temperature-transformation or "TTT" curve of the steel as to prevent transformation of the austenite into any of the higher temperature transformation products such as pearlite, ferrite, bainite, etc. Since for SAE 6150 steel the lower nose of the TTT curve occurs at about 750° F., it is necessary to cool the steel strip down to about 700° F. with sufficient rapidity, i.e. in about 6 seconds, to get past the transformation curve while still retaining the steel in the fully austenitic state. Thereupon the steel is air cooled down to ambient temperature with tarnsformation into a fully martensitic structure, with a minimum of quenching stress. In the normal cycle of operation of the FIG. 6 strip feed rate, several minutes is available for such air cooling for cooling the strip below about 200° F. as it passes from the chill plate to a subsequent tempering furnace 107 in which time the transformation of the austenite to martensite is substantially complete. The resultant hardness imparted to the steel strip is about "C" 60 Rockwell.

In the chill plate or block construction shown in FIG. 22, the lower edge of the band saw strip stock 10 slides along the base of longitudinal slot 89 of the chill plate block 90, and is thus cooled by direct contact with the chill block. Although this produces rapid chilling of the strip, it tends to induce distortion therein which is eliminated by the modified construction shown in FIGS. 22a and 22b, wherein the chill block consists of two blocks 350, 351, of metal of high thermal conductivity, such as copper, which are longitudinally channeled in complementary configuration, as at 351, 352, the blocks being bolted together, as at 353, 354, whereby the channeled portions form a tunnel, as at 355, through which the strip 10 passes wholly out of contact with the metal blocks, in the manner shown in the transverse sectional view of FIG. 22b. As in the FIG. 22 embodiment, the chill block assembly 350, 351, is chilled by circulation of a coolant liquid, such as cold water, through longitudinally extending ducts provided therein, as at 356, 357, supplied with the coolant liquid through inlet and outlet connections, as at 358, 359. If necessary, the chill block cooling of the strip stock may be supplemented by forced air and nitrogen jet cooling as described below with reference to FIG. 22c. In other respects, the construction and operation of the FIGS. 22a and b embodiment is the same as that above described FIG. 22, like elements being similarly designated.

Referring now to FIG. 22c, there is shown a box-like housing, as at 360, with the top and front sidewalls removed to show the interior construction. The band saw strip stock 10, after passing through the induction heating coil 86, is fed progressively into, through and out of the housing through inlet and outlet ports 361, 362. Disposed within the housing adjacent the inlet port 361, are a pair of flared or fan shaped nozzles 362, 363, disposed on opposite sides of the strip 10, respectively, for directing jets of cold nitrogen gas against the opposite surface of the strip, as indicated at 364, 365, this gas being supplied over pipe connections extending to the nozzles, as at 366–368, incl., fed from a supply of nitrogen gas connected to pipe 368. The housing 360 is divided into two chambers 370, 371, by an interposed partition 372, provided with a port 373 for passage of the strip as shown. The roof of chamber 370 may be provided with an adjustable outlet port, as at 97a, FIG. 22, for escape and recirculation of the nitrogen gas. In chamber 371 there is mounted beneath the path of transverse of the strip but out of contact therewith, a cooling coil 375, through which is circulated a coolant liquid, such as cold water, through inlet and outlet connections, as at 376, 377. Also mounted in chamber 371 is a chimney 378, closed at both ends except for inlet and outlet pipe connections 379, 380, through which additional cool nitrogen gas is circulated from a source connected to pipe 379. The chimney is provided with inlet and outlet ports as at 381, 382, for passage of the strip 10. As the strip passes out of the housing 360, it is further cooled by blasts of cool air directed against opposite sides of the strip as at 383, 384, supplied from nozzles 385, 386, connected to pipelines 387–389, and supplied with air under pressure from a blower 390 interposed in pipeline 390.

Reverting to FIG. 22a, the valve pipeline 97 for intake of nitrogen gas may be replaced by the nozzle and blower arrangement 362–369, incl., of FIG. 22c for directing blasts of cold nitrogen gas against the opposite sides of the strip as in the FIG. 23c embodiment. In both the FIGS. 22a and b and FIG. 23c embodiments, the strip is fed under tension through the housings so that it nowhere contacts any of the components described, this by reason, reverting to FIG. 6, of the tension imposed on the strip between the tensioning rolls 80, 81 and the driven feed rolls 109.

The rapid cooling arrangement shown for the apparatus of FIGS. 22–22c, incl., is required primarily for cooling strip stock made of a quench hardenable steel or steel alloy, such as SAE 6150. This drastic cooling is not required in the case of air hardening steel alloys, such as Timken 17–22–A, of the approximate composition 0.45% C, 0.55% Mn, 0.65% Si, 1.25% Cr, 0.5% Mo, 0.25% V, balance Fe.

Referring to FIG. 6, the strip 10 next passes through a guide block 100 and under an inspection station 101, which is similar to inspection station 59, and thence through a tensioning unit 103. This unit is controlled by a hydraulic cylinder 104 for pressure actuating a movable brake shoe 105 toward a fixed brake shoe 106, with the strip 10 passing between said brake shoes. The strip 10 next passes through a tempering furnace 107 wherein it is given a short-time tempering treatment at about 950° F. which tempers the base metal down to about "C" 40–45 Rockwell.

On leaving the tempering furnace 107, the strip passes between a cluster of straightening rollers 108, before passing through the rolls 109 of a drive unit like that of FIGS. 15–18, inclusive. The strip passes thence under a roller 110 of a counter 111 and thence onto a take-up reel 112 driven by a motor 113.

Since the untempered martensitic structure of the steel strip as it leaves the quenching unit 87 is quite brittle, it is desirable to avoid bending the strip prior to tempering. Hence the strip is fed in a straight path between units 87 and 107, and then is straightened in rollers 108.

The armor coating applied to the strip 10 as processed in accordance with the FIG. 6 sequence, has the appearance as shown in approximately actual size in FIG. 7 and in enlarged view in FIG. 8 at 115. Referring to FIG. 8 the base metal of the saw band is shown at 116. The carbide particles are shown typically at 118 embedded in the brazing metal 119 and projecting therefrom as shown to form sharp cutting edges.

Referring now to FIGS. 11 and 12 for a more detailed description of the coating unit 52, FIG. 6, the unit comprises a hopper 53 for containing a supply 120 of the mixture of paste flux and brazing metal powders. The paste flux is continuously pumped from an outlet 121 at the base of the hopper, over a pipeline 122 by means of an interposed pump 123 and discharged over an outlet 124 pipeline against the pick-up roll 54 of the coating unit. Pump 123 comprises a section of flexible tubing 123a formed into a U loop as shown, and a motor driven rotary element 123b, terminating at its opposite ends in rollers as at 123c, which bears against and squeeze the tubing when in the horizontal position of element 123b as shown, and thus provide pumping action as aforesaid. The pick-up roll 54 is driven in the direction of the arrow thereon by means of a motor 125 and interposed reducing gear 126 coupled to the shaft 127 of the roll 54. A wing nut 127a secures roll 54 on shaft 127. The motor is equipped with a manually or automatically controlled variable speed drive of conventional construction (not shown) for synchronizing with the speed at which the strip drive unit 73, FIG. 6 is functioning. The pumping action of pump 123 prevents the solids in the coating flux-brazing metal powder mixture from settling to the bottom of the hopper 53, and also is required adequately to coat the pick-up roll 54 as it rotates.

The roll 54 is encircled by a tire 128 of channel like configuration as shown in FIG. 12, which rides against a toroidal shaped tire 129 of a transfer or regulator roll 54a, rotatable on a shaft 131, and held thereon by a wing nut 132. The rear end of shaft 131 is mounted upon a slide bar 133, containing a slot 134, through which extends a thumb screw 135, threading into a frame 136, to permit a vertical adjustment of the slide bar and roll 130 carried thereby.

The tire 129 of roll 130 rides against a peripherally grooved tire 137, of a feed roll 55, rotatably mounted on a shaft 139 and held thereon by a wing nut 140. Shaft 139 is mounted upon a second slide bar 141, containing a slot 142, and which is detachably secured to frame 136, by a thumb screw 143 for vertical adjustment of the bar and roll.

For removing excess paste flux from the sides of roll tire 137, a bifurcated wiper 144 is provided, which is pivotally mounted on a screw bolt 145, which extends through the frame 136 and is secured thereto by a nut 146. An adjustment thumb screw 147 threaded through a nut 148, secured to the frame, bears against the free end of the wiper 144, for varying the angular inclination thereof. A spring 149 holds the wiper 144 resiliently against the lower end of the thumb screw 147.

As above stated, the tire 137 of roll 54, is peripherally grooved, as at 150, for reception of the upper edge of the band saw strip 10, as in the manner shown in FIG. 12. To this end the strip is supported edgewise within the groove 150, by a metal guide 151, containing a groove 152, within which the strip slides, as shown. Guide 151 is resiliently carried by an angle member 153, bolted to the frame 136, as shown. Threaded through the angle member and bearing against the guide base, is a thumb screw 154 having a helical spring 155 interposed thereon between the screw head and the angle plate for resiliently supporting the guide 151.

The air blast unit 70 of FIG. 6, comprises, referring to FIGS. 13 and 14, a pair of threaded pedestal rods 160, 161, carried by a base member 162. A pair of pedestals 163, 164, are internally threaded to receive the threaded portions of the pedestal rods 160, 161, respectively, and thus permit vertical adjustments of the air nozzles 71, 72, which are pivotally secured as at 165, 166, to angular brackets, 167, 168, carried by the pedestals 163, 164. The pedestals are locked in position at the desired elevation by lock nuts as at 168a. The lower horizontal portions of the nozzle bracket 167, 168, extend within elongated slots 169, 170 of the pedestals, 164, 163, and are adjustable secured to the pedestals by bolts 171, 172. The nozzle brackets are also notched, as at 173, 174, to permit guided lateral movement of the brackets 167, 168, on the pedestals, respectively. Each pedestal 163, 164, at its upper end is in the shape of a channel member having short, upstanding sides, as at 175, 167, through which are respectively threaded adjusting screws 177, 178. The vertical portions of the nozzle brackets 167, 168, pivotally support the nozzles 71, 72 as at 165, 166 in elongated slots as at 179 of the brackets, so that when the desired angular position with relation to the strip is made, the set screws, as at 180, 181 and 182, 183 lock the nozzle in position. It will thus be seen that vertical and lateral adjustments of the nozzle brackets can be achieved in relation to the strip, while angular adjustments of the nozzles themselves can also be made to secure the most effective action in blowing loose particles out of the gullets without disturbing those adhering to the coated edge of the band saw stock.

The drive units 73 and 109 of FIG. 6 will now be described in detail with reference to FIGS. 15–18, inclusive. A motor 190 has keyed to its output shaft 191, a coupling 192, to the upper end of which is keyed a spur gear 193 by means of a set screw 192, whereby the spur gear is positively driven by the motor. The spur gear is rotatable about a shaft 195 which extends upwardly through aligned bores in the forks of a bifurcated roller arm 197, the forked portion of which also spans a support member 196a through which the shaft also extends thereby pivotally to support the roller arm on the support 196a, which in turn is bolted to a frame member 196b. A second bifurcated roller arm 198 is similarly drilled in the forked portion for interposition of a support member 199, also bolted to the frame 196b, the forked portion of the roller arm and the support being also drilled for reception of a shaft 200, thereby pivotally to support the roller arm 198. A spur gear 201 is rotatably mounted on shaft 200 in meshing engagement with spur gear 193. The roller arms 197 and 198 are drilled at their opposite ends, respectively, for rotatable reception of shafts 205 and 206, to the lower ends of which are respectively keyed, spur gears 207 and 208 in meshing engagement with spur gears 193 and 201, respectively, as is most clearly shown in FIG. 18. The shafts 205 and 206 have keyed to their upper ends a pair of gripping rollers 209 and 210, adapted to engage and drive the strip 10. From FIGS. 16 and 18, it will be seen that the drive motor keyed to spur gear 193, drives the spur gears 201 and 207 meshing therewith and that spur gear 201 in turn drives spur gear 208, whereby the gripping rollers 209 and 210 keyed to shafts 205 and 206 are correspondingly driven to feed the strip 10 when the gripping rollers are in contact therewith.

A lever arm 211 is bolted to roller arm 198, as at 212, and is thus rotatable with the roller arm about shaft 200. Referring more particularly to FIG. 15, the left end of the lever arm 211 is drilled to receive a bolt 216 which extends therethrough and thence through a helical expansion spring 217 and thence through one flange 215 of an angle member, the opposite flange 213 of which is bolted to the support 196a. The bolt 216 is held in place by a nut 217 threaded thereon and seating against the angle flange 215. The expansion spring 217 thus urges the lever arm 211 and with it the roller arm 198 in a counter-clockwise direction about shaft 200. A latching or locking lever 218 is pivotally secured at one end, as at 219, to the outer end of the roller arm 197, and has a shoulder 220 near its opposite end adapted to engage a corner 220a of the roller arm 198 in the manner best illustrated in FIG. 15. A tension spring 221 has one end fastened to the roller arm 198 and the other end to the locking lever 218. It will thus be seen by reference to FIG. 15 that with the shoulder 220 of the latching lever 218 engaging the corner 220a of the roller arm 198, the gripping rollers 209 and 210 will be spaced away from the strip 10 so that the strip will not be driven thereby. If now the lower end of the latching lever 218 is manually displaced counter-clockwise about its pivot point 219, the shoulder 220 thereof will disengage the corner 220a of the roller arm 198, thus permitting the expansion spring 217 to rotate the roller arm 210 counterclockwise about its pivot support 200, while the tension spring 221 rotates the roller arm 197 clockwise about its pivot point 195, whereby the gripping rolls 209, 210 are forced into gripping engagement with the strip 10 to drive the same in the direction of the arrow, FIG. 15. While the strip is thus being driven, if it is desired to stop the drive, it is necessary only to rotate the lever arm 211 clockwise until the shoulder 220 on the latching arm again slips over the corner 220a of the roller arm 198, whereby the portion of the latching lever between its pivot point 219 and its shoulder 220 forces the roller arms 197 and 198 apart at their outer ends and thus disengages the gripping rollers 209, 210 from gripping or pinching engagement with the strip.

A pair of lever arms 222, 223, are pivotally secured at one end of each to the opposite faces of flange 215 of the angle bracket by means of bolt 227. The other ends of these lever arms have rollers 224 and 225 rotatably attached thereto. The levers 222 and 223 have approximately at their midpoints, respectively, a pair of adjusting screws 226. The levers carrying rollers 224 and 225 pivoting about bolt 227, are adjusted by screws 226 so as to raise or lower said rollers to the desired height over the strip 10, to support the strip when passing between the gripping rollers 209 and 210.

A hold down roller 228, carried by a bracket 229, mounted on support 196 rides on the upper edge of the strip 10. The roller 228 itself is at one end of a lever 230 which is pivotally mounted to bracket 229 by bolt 231. A spring 232 and adjusting screw 233 co-act to keep roller 228 in its proper position with regard to the end of the strip 10. This hold down roller assembly is brought into use only in the drive unit 109, FIG. 6.

The infra-red ray heating unit 77 of FIG. 6, will now be described with reference to FIG. 19. It consists of an elongated metal channel member 235 carried by any suitable supporting structure 236. Extending interiorly along the opposite sides thereof are metal brackets, as at 237, 238, which are bolted to member 235, as at 239, 240. In the brackets 237, 238, are mounted hollow channel members 241, 242 of heat reflecting construction. Infra-red ray heating elements, as at 243, 244, are mounted within the channel members 241, 242, as by means of spaced supports 243a, 244a, and extend therealong the full length of channel 235. An upstanding metal support member 245, extends interiorly along the length of the channel member and has bolted thereto, as at 246, a rectangular bar 247, which is longitudinally grooved along its upper surface, as at 248, for reception and passage of the band saw strip stock 10.

The tensioning device 82 of FIG. 6 will now be described with reference to FIGS. 20 and 21. Referring thereto, the strip 10 is fed between a pair of rolls 250, 251, one of which, i.e., roll 250, is rotatably mounted on a fixed axis 250a in a supporting member 252. The other roll 251 is rotatably mounted on a shaft 253 which extends through a bore 254 of the supporting member 252 and terminates beneath said member in a terminal portion 255 of lesser diameter than the main portion of the shaft. The terminal portion 255 seats on a bore 255a of an elongated arm 256, which seats on a horizontally disposed flange of an angle member 256a, and is pivotally secured thereto, as at 257, at the opposite end thereof from said bore 255a. The vertical flange of said angle member 256a has tapped therethrough a screw 258 which may be adjustably positioned with respect to the arm 256, and which may be locked in position by means of a lock nut 259. By loosening the lock nut the screw is adjusted to bear against the pivoted arm 256 and thus displace roller 251 toward roller 250 to the extent of applying a desired tensioning pressure on the strip 10, whereupon the screw is locked in the position of adjustment by the lock nut 259.

Reverting to FIG. 6, after the armored strip has been wound onto the take-up reel 109, it is subsequently unreeled and fed through a grit blasting apparatus as illustrated in FIGS. 23, 24 and 25, to grit blast the strip, to remove flux, scale and other undesirable material adhering thereto. The grit blast unit, comprises a housing 260, within which is mounted a grooved support for the strip, as at 261, shown in enlarged end view in FIG. 25, supporting in the groove 262 thereof, the strip 10, in upright, edgewise position. On opposite sides of the strip support are mounted grit blast nozzles, as at 41, 42 for directing grit blasts as at 273, 274, against the opposite side surfaces. The nozzle assemblies are slidably so mounted on a support bar 275 as at 276, 277, for adjustment toward or away from the strip 10 to provide for the optimum grit blasting action. As was above explained with reference to FIG. 10, this grit blasting apparatus is also employed to remove burrs from the gulleted strip prior to coating, except that in the deburring operation the grit blast nozzles are adjusted as in FIG. 10, whereas in grit blasting the armor coated strip the nozzles are adjusted as in FIG. 24 relative to the strip.

Referring now to FIG. 26, in the modification of the method and apparatus therein shown for producing armored band saw strip stock in accordance with the invention, the paste flux and brazing metal powders are separately applied to the strip, in contrast to the FIG. 6 embodiment above described, wherein these constituents are admixed and applied to the strip stock on one application. Thus, in the FIG. 26 embodiment, the arcuately blanked strip stock 10 is fed from the take-off reel 50 thence through guide 51 and thence beneath the grooved coating roll 138 of the coating unit 52. In this case, however, the hopper 53 of the coating unit contains only the paste flux, such, for example, as the "Nicrobraz" flux above described, whereby the coating roll 55 applies only the paste flux to the strip to about the depth shown at 312 in FIG. 27. The strip passes thence under the discharge lip 56 of the vibratory feeder 57, the spiral trough 58 of which in this instance contains only the brazing metal powder, such as powders of the "LM Nicrobraz" alloy above described. Due to the action of vibratory feeder 57, the brazing metal powder is thus progressively propelled in a thin layer over the discharge lip 56 thereof, and falls thence as a curtain of the powdered metal transversely across the strip. A thin layer of the metal powder is thus disposed on the paste flux coated surfaces of the strip, as limited, however, to the extent of adherence of the metal powder to the paste flux coating. The strip passes thence under the inspection unit 59 and thence through a spraying unit 301, for spraying a fine mist of an aqueous solution of glue onto the coated strip surfaces, which solution is applied over a pipeline 302, with the sprayed excesses falling into a container 303. The strip is fed thence beneath the discharge lip 304 of a second spiral type syntron vibrator 305, like that of 57, the spiral trough 306 of which contains a supply 307 of the powdered metal carbide particles, such as tungsten carbide particles, or equivalent diamond substitute particles, which are propelled in a thin layer over the discharge lip 304 of the vibrator and fall thence in a curtain of powders transversely across the strip edge, causing a thin layer of said particles to adhere to the adhesively coated surfaces of the strip. The strip is fed thence past an air blast unit 308 supplied with a compressed air blast over pipelines 309, 310, which blows the strip gullets free of brazing metal and carbide powders. From this point on, the processing of the FIG. 26 embodiment is identical with that of FIG. 6 above described.

Reverting to FIGS. 9a and 9b, the continuous armoring coating shown at 320 of FIG. 9a may be applied to the band saw strip stock 10 in any of the ways above described except that, referring to FIGS. 6 and 26, no air blast is directed against the coated strip as at 70 FIG. 6 or 308, FIG. 26. However, in producing the spaced armoring coatings as at 321 of FIG. 9b, a continuous coating is first applied as at 320, FIG. 9a, which coating is then blown off at spaced intervals, as at 322, by the air blast nozzles 70, FIG. 6 or 308, FIG. 26, which in this instance are supplied with intermittent or pulsating jets of air.

As a further alternative method, the coating unit 52 may be used to apply an alcohol solution of shellac or other organic adhesive, such as described in the Dawson patents to which reference has been made above. Separate "vibratory" hopper feeds may be used to apply a powdered cobalt base brazing alloy such as one of the Stellite compositions and a powdered flux such as borax or these two powders may be admixed with a shellac binder, caked and reground to prevent segregation while permitting feeding with a single hopper. If applied by separate hoppers, it may be desirable to wet the surface with a mist of alcohol after the application of the first powder to bring a sufficient amount of the shellac to the surface to again render the surface adhesive. The carbide grit may be similarly applied following a re-wetting with an alcohol mist, or a composite cake of brazing alloy, powdered flux and carbide particles may be formed with shellac and reground for application from a single "vibratory" hopper feeder to a surface rendered adhesive with paste flux or organic adhesive.

Referring now to FIGS. 28 and 29, FIG. 28 as shown by the legend thereon, is a view of a polished and etched section of one tooth of gulleted, armored ½ inch band saw strip stock, as taken longitudinally, thereof, and as produced in accordance with the FIG. 6 sequence wherein the adhesive flux and brazing metal powders are premixed prior to application to the band saw strip stock and wherein the coating thus applied is overcoated with carbide particles of 50/70 mesh. FIG. 29, as shown by the legend thereon, is a view of a polished and etched section as taken transversely through one tooth of gulleted, armored ½" band saw strip stock, as produced in accordance with the FIG. 26 sequence wherein the paste flux adhesive and brazing metal powders are separately applied by first applying the paste flux adhesive and then overcoating the same with the brazing metal powders and finally overcoating the brazing metal powder coating with a coating of carbide particles of 50/70 mesh.

In the drawings the scales shown thereon give actual dimensions of the armor coatings. Comparing the two modes of production, it will be seen that each results in armored coatings in which the abrasive or carbide particles are partially embedded in a relatively thin layer of bazing metal and project considerably beyond the same to form a series of sharp cutting edges. The etched sections establish that the carbide particles project beyond the matrix metal layer to an average extent of at least about ⅓ to ½ their average transverse dimensions. It will further be seen from these drawings that the thickness of the brazing metal layer ranges from about 0.002 to 0.01 inch and that the carbide particles project above the adjacent matrix metal layer by about 0.005 to 0.01 inch; and also project above the base metal by about 0.01 to 0.025 inch. Examination of the etched sections at higher magnifications than shown in the drawings, establishes that the brazing metal is metallurgically bonded to the carbide particles and therefore "wets" the same at the brazing temperature. It further establishes that the brazing metal is alloyed with the base metal over a narrow zone shown by the so designated wavy line separating the two in each of FIGS. 28 and 29.

Accurate measurements and computations have established that the thickness of the brazing metal layer is not noticeably affected by the grain or grit size of the carbide particles embedded.

The following is the actual overall height of plain band and finished bands coated with three different grit sizes of carbide particles embedded in brazing metal coatings as measured on a Jones & Lamson Optical Comparator at 10X magnification

```
                                        Actual height, inches
No grit ------------------------------------- .375
70/100 grit --------------------------------- .385
50/70 grit ---------------------------------- .389
40/50 grit ---------------------------------- .394
```

The following is the calculated height of the same three bands without the brazing alloy.

|  | 70/100 grit | 50/70 grit | 40/50 grit |
| --- | --- | --- | --- |
| Height of band | .375" | .375" | .375" |
| Grit size | +.008" | +.012" | +.017" |
| Calculated height | .383 | .387 | .392" |

The following is the indicated thickness of the braze layer based on the difference between the actual height as coated and the calculated height without brazing alloy.

|  | 70/100 grit | 50/70 grit | 40/50 grit |
| --- | --- | --- | --- |
| Actual height | .385" | .389" | .394" |
| Calculated height | −.383" | −.387" | −.392" |
| Indicated thickness | .002" | .002" | .002" |

In order to assure that the carbide particles will project beyond the matrix layer to form a series of shap cutting or abrading edges, the carbide particles are of a grain size substantially exceeding the thickness of the matrix coating layer. Preferably, the thickness of the matrix coating layer does not exceed about one-half to two-thirds the average transverse dimensions of the abrasive particles, whereby said abrasive particles project beyond said coating layer to an average extent of about one-third to one-half their average transverse dimensions. The thickness of the matrix coating is controlled to some extent by the grain size of the brazing metal powders, which tend in the FIG. 26 process of application, to adhere in a single layer to the flux coated strip, with the excess sloughing off under gravity action. Hence, the carbide or other diamond substitute abrasive particles should substantially exceed in grain size, the dimensions of the brazing metal powders.

A suitable grain size for the brazing metal powders is about 150 mesh, i.e. 0.0041", or under. For the carbide or equivalent diamond substitute particles, a suitable size range is about 50–100 mesh, i.e., 0.0117–0.0059", referring to mesh sizes as determined by the ASTM specification E11 of 1958. Preferred ranges for the diamond substitute particles are about −50/+70 mesh and −70/+100 mesh; 70 mesh is 0.0083". In round numbers, the grain size of the matrix metal particles is about 0.004" and under and that for the abrasive particles about 0.006–0.012" and may range up to about 0.025".

Tests have also indicated that the magnetic field set up by the induction heating coil 86, FIGS. 6 and 22, tends to attract the tungsten carbide particles, and hold them out from the matrix surface in the manner illustrated in FIGS. 8 and 28.

A suitable base metal for the band saw strip stock is SAE 6150 steel. This steel quenches from austenite to martensite with hardness of about 60–62 Rockwell "C" and may thereafter be tempered to a desired lower hardness and ductility.

The brazing or matrix metal is preferably a hard, refractory metal alloy, of non-eutectic character, having a substantial softening or plastic temperature range between liquidus and solidus points, below the melting point of the tool base metal and within the temperature range of about 1500–2400° F. As above stated, suitable such alloys are of the cobalt-base or nickel-base types, such as the nickel-base alloys containing about 5–15% Cr. 1–3.5% B, 2–5% Fe, without and with silicon up to about .5 to 10%, and carbon up to about 0.25%, having brazing temperatures within the range of about 1700–2200° F. The cobalt-base "Stellite" alloys are also suitable, containing about 40–80% Co, 20–35% Cr, 0–25% W, 0–3% Si and 0.75–2.5% C.

Although the invention has been particularly described as applied to the production of armored band saws and band saw stock, the same principles of production above described are similarly applicable to the production of other types of armored tools, such as cylindrical rod saws, hack saw blades, disc cutters, files, etc. As applied to each a thin coating of the paste flux adhesive alone or admixed with the matrix metal powder is first applied to the base metal of the tool over the area to be armored, and thereupon an overcoating of the abrasive metal particles applied. The armored portion, or alternatively the entire tool if the tool is to be heat treated, is thereupon rapidly heated to temperature sufficiently high to fuse the matrix metal powders into a thin coating layer and to alloy the same with the base metal and also partially to embed the abrasive particles therein. Thereupon the armored portion or the entire tool, as the case may be, is cooled to ambient temperature, permanently to bond the matrix metal layer to the base metal and permanently to embed the abrasive particles therein to the extent of their embedment in the matrix metal layer, and also to harden the tool base metal if it is to be heat treated.

Preferably, high frequency electrical induction heating is employed. Where only the armored portion requires heating, the frequency of induction is preferably just sufficiently high to penetrate into the base metal only to the required extent to fuse the matrix metal particles into a thin coating layer and to fusion bond the matrix metal layer to the base metal, and such heating is applied only for the duration required to accomplish the above, whereupon the current energization is abruptly terminated in order that the cool base metal will rapidly cool and solidify the matrix metal layer. Alternatively, if the base metal is to be concurrently heat treated, as in the case of a ferritic steel or alloy steel base, the frequency of induction heating and the arrangement of the induction heating means is made such that the entire body of the armored tool is heated above the fusion temperature of the matrix metal and thereupon cooled with sufficient rapidity to harden the tool base metal while solidifying the matrix metal.

With respect to small tools to be armored, such as rod saws, hack saws, files and the like, the armoring is best applied by first spraying or brushing onto the base metal, a thin coating of the paste flux adhesive. The matrix metal powders are next applied by feeding the so coated tool beneath a falling curtain of the matrix metal powders while rotating the tool about its axis if it is desired to coat all surface portions thereof, a glue spray is then applied, following which the final coating of abrasive particles is applied by the same technique as the matrix powders.

Where only a relatively flat surface of a tool base is to be armored, the paste flux adhesive is preferably first applied by spraying or brushing. The tool is then fed beneath a falling curtain of the matrix metal powders with the surface being armored disposed at a sufficient angle of inclination to the horizontal that the excess of metal powders will fall off of the coated surface, leaving only a thin layer adhering thereto. A fine spray of an aqueous glue solution is next applied to the so coated surface and the final overcoating of abrasive particles applied by the same procedure as the matrix metal particles.

What is claimed is:

1. The method of producing an armored metal cutting tool, comprising a tool structure consisting of a base metal of high strength and fracture resistance selected from the group consisting of heat treatable steels and alloy steels, said tool structure having over at least a surface portion thereof, a hard wearing, ductile and adherent, abrasive coating, which comprises; coating said surface portion with a paste flux adhesive selected from the group consisting of tung oil, natural, synthetic rosins and resins and boride-fluoride materials in a volatile solvent, and with particles of a strong, ductile and refractory matrix metal selected from the group consisting of high melting nickel base and cobalt base alloys containing about 40–80% of said base metal and the balance principally elements of the group Cr, B, Fe, Si, W and Mo, applying to said coating, an over coating of abrasive particles of a hard, high melting, diamond substitute material selected from the group consisting of high melting, metal carbides, metal borides, metal nitrides and metal silicides, drying the so coated surface and heating to temperature sufficient to fuse said matrix metal particles to one another and to alloy the same with said base metal and into a matrix metal layer partially embedding said abrasive metal particles therein, thence rapidly cooling said so coated surface to ambient temperature, permanently to bond and alloy said matrix metal to and with said base metal and to retain said abrasive particles permanently embedded in said matrix metal and bonded thereto; and so controlling the thickness of the coating of said matrix metal particles, as only partially to embed said abrasive particles in said matrix metal layer, whereby said abrasive particles project from said layer to form sharp cutting edges.

2. The method of applying an armoring coating along an edge of a strip of a base metal selected from the group consisting of heat treatable steels and alloy steels to produce armored band saw strip stock, which comprises: progressively coating said strip edge with a paste flux adhesive selected from the group consisting of tung oil, natural, synthetic rosins and resins and boride-fluoride materials in a volatile solvent, and with particles of a strong, ductile and refractory brazing metal selected from the group consisting of nickel base and cobalt base alloys containing about 40–80% of said base metal and the balance principally elements of the group Cr, B, Fe, Si, W and Mo, thence progressively applying to the so-coated strip edge, an over-coating of abrasive particles of a hard, high melting diamond substitute material, selected from the group consisting of high melting, metal carbides, metal borides, metal nitrides and metal silicides, thence progressively heating said strip at relatively low temperature to dry said paste flux and thence at temperature sufficiently high to austenitize said ferrous base metal and to fuse said brazing metal particles to one another and to alloy the same with said base metal and into a matrix metal layer partially embedding said abrasive particles therein, thence progressively cooling said strip to temperature sufficiently low and with sufficient rapidity to harden said base metal and permanently to bond said matrix metal layer to said base metal and alloy the same therewith and to retain said abrasive particles permanently and partially embedded in and bonded to said matrix metal layer, with said abrasive particles projecting therefrom to form sharp cutting edges.

3. The method according to claim 1, wherein said abrasive particles have a grain size substantially exceeding the grain size of said matrix metal particles.

4. The method according to claim 3 wherein the grain size of said matrix metal particles is about 0.004 inch and under and wherein the grain size of said abrasive particles is about 0.006 to 0.025 inch.

5. The method according to claim 3, wherein the thickness of said matrix metal layer is so controlled as not to exceed one-half to two-thirds the average transverse dimensions of said abrasive particles, whereby said abrasive particles project beyond said matrix layer to an average extent of about one-third to one-half their average transverse dimensions.

6. The method according to claim 3, wherein the thickness of said matrix metal layer is so controlled as to range from about 0.002 to 0.01 inch, and wherein said abrasive metal particles project above the adjacent matrix metal by about 0.005 to 0.01 inch.

7. The method according to claim 1 wherein said matrix metal particles are fusion bonded by high frequency electrical induction heating.

8. The method according to claim 1, wherein said paste flux during said heating volatilizes in part leaving a residuum which is absorbed into said matrix and base metals.

9. The method according to claim 1, wherein said abrasive particles project above said base metal by about 0.01 to 0.025 inch, and project above the adjacent matrix metal by about 0.005 to 0.01 inch.

10. The method according to claim 1, wherein said base metal comprises a ferrous alloy having an austenitic structure on heating to said fusion bonding temperature and which transforms to martensite on cooling thence with sufficient rapidity to ambient temperature.

11. The method according to claim 1, wherein said powdered brazing metal is admixed with said paste flux adhesive and applied as a single coating to said surface portion of said tool, and the so coated surface portion then overcoated with said abrasive particles.

12. The method according to claim 1, wherein said paste flux adhesive is applied as a first coating to said surface portion of said tool and wherein said first coating is overcoated with said powdered matrix metal and the so coated surface portion then overcoated with said abrasive particles.

13. The method according to claim 1, wherein said powdered matrix metal particles are made of an alloy selected from the group consisting of said cobalt-base and nickel-base alloys, having a brazing temperature within the range of about 1500–2400° F.

14. The method according to claim 1, wherein said matrix metal particles are made of an alloy containing about 5–15% chromium, 1–3.5% boron, 2–5% iron up to 10% silicon up to 0.25% carbon and the balance substantially nickel.

15. The method according to claim 1, wherein said matrix metal particles are made of an alloy containing about 20–35% chromium, up to 0.75% carbon, up to 3% silicon, up to 25% tungsten and the balance substantially cobalt.

16. The method according to claim 2, wherein said strip is progressively coated with said paste flux adhesive admixed with said powdered brazing metal.

17. The method according to claim 2, wherein said strip edge is progressively and successively coated first with said paste flux adhesive and thence with said powdered brazing metal.

18. The method according to claim 2, wherein a thin layer of said admixture of paste flux adhesive and powdered matrix metal is progressively rolled onto said strip edge and the strip fed thence beneath a falling curtain of said abrasive metal particles for overcoating said layer therewith.

19. The method according to claim 2, wherein a thin layer of said paste flux adhesive is rolled onto said strip edge and the strip fed thence beneath a falling curtain of said matrix metal particles for applying an overcoating of said particles to said adhesive layer, thence spraying an adhesive onto the so coated strip edge and wherein the so coated strip edge is fed thence beneath a falling curtain of said abrasive metal particles for superimposing on said coating of matrix metal particles an overcoating of said abrasive metal particles.

20. The method according to claim 2, wherein said abrasive particles have a grain size substantially exceeding the grain size of said matrix metal particles.

21. The method according to claim 2, wherein the thickness of said matrix metal layer is so controlled as not to exceed one-half to two-thirds the average transverse dimensions of said abrasive particles, whereby said abrasive particles project beyond said matrix layer to an average extent of about one-third to one-half their average transverse dimensions.

22. The metal according to claim 21, wherein the thickness of said matrix metal layer is so controlled as to range from about 0.002 to 0.01 inch and wherein the particle size of said abrasive particles is such that they project above said base metal by about 0.01 to 0.025 inch.

23. The method according to claim 2, wherein said matrix metal particles are fusion bonded by high frequency electrical induction heating and thence cooled in a substantially non-oxidizing atmosphere.

24. The method according to claim 2, wherein said paste flux during said heating volatilizes in part leaving a residuum which is absorbed into said matrix and base metals.

25. The method according to claim 2, wherein said heated and austenitized strip is cooled thence with sufficient rapidity to a sufficiently low temperature below about 200° F. to convert said austenite to martensite.

26. The method according to claim 24, wherein the so hardened strip is thence subjected to a tempering heat treatment at about 950° F.

27. The method according to claim 26, wherein the tempered strip is roller leveller straightened.

28. The method according to claim 20, wherein said abrasive particles have a grain size of about 0.006 to 0.025 inch and wherein said matrix metal particles have a grain size of about 0.004 inch and under.

29. The method according to claim 2, wherein said strip prior to coating is blanked along one edge to provide a series of projecting portions spaced by cut out portions, and wherein said armoring coating is applied only to said projecting portions.

30. The method according to claim 29, wherein said blanked strip edge is deburred and has imparted thereto a matte surface prior to applying said armoring coating.

31. The method according to claim 2, wherein said armoring coating is applied continuously and uninterruptedly along said strip edge.

32. The method according to claim 2, wherein said armoring coating is applied intermittently along said strip edge to provide along said edge a series of armored portions spaced by unarmored portions.

33. The method according to claim 2, wherein the armored strip is grit blasted on its opposite surfaces to remove scale and other foreign adherences.

References Cited

UNITED STATES PATENTS

| | | | |
|---|---|---|---|
| 2,339,208 | 1/1944 | Vanderpyl | 51—309 |
| 2,427,565 | 9/1947 | Liger | 51—309 |
| 2,784,536 | 3/1957 | Barron | 51—309 |
| 2,906,612 | 9/1959 | Anthony et al. | 51—309 |
| 3,248,189 | 4/1966 | Harris | 51—309 |
| 3,378,361 | 4/1968 | Harris | 51—309 |

DONALD J. ARNOLD, Primary Examiner

U.S. Cl. X.R.

51—309